US006047280A

United States Patent [19]
Ashby et al.

[11] Patent Number: 6,047,280
[45] Date of Patent: Apr. 4, 2000

[54] INTERFACE LAYER FOR NAVIGATION SYSTEM

[75] Inventors: Richard A. Ashby, Hebron; Paul M. Bouzide, Chicago; Vijaya S. Israni, Hoffman Estates; David S. Lampert, Highland Park; Senthil K. Natesan, Carol Stream; Grant S. Killey, Westmont; John C. Jasper, Arlington Heights; Robert P. Fernekes, Wooddale; Jerry S. Feigen, Chicago, all of Ill.

[73] Assignee: Navigation Technologies Corporation, Rosemont, Ill.

[21] Appl. No.: 08/740,298

[22] Filed: Oct. 25, 1996

[51] Int. Cl.[7] .................................................. G06F 17/30
[52] U.S. Cl. .............................. 707/2; 707/104; 340/988; 340/990; 340/995; 701/200; 701/208; 701/209; 701/211
[58] Field of Search ..................................... 340/988, 990, 340/995; 701/200, 208, 209, 211; 707/2, 104

[56] References Cited

U.S. PATENT DOCUMENTS

| | | | |
|---|---|---|---|
| 4,086,632 | 4/1978 | Lions | 701/210 |
| 4,630,209 | 12/1986 | Saito et al. | 701/201 |
| 4,888,698 | 12/1989 | Driessen et al. | 701/200 |
| 4,937,572 | 6/1990 | Yamada et al. | 340/995 |
| 4,970,652 | 11/1990 | Nagashima | 701/208 |
| 4,972,319 | 11/1990 | Delorme | 340/990 |
| 5,036,471 | 7/1991 | Tamura et al. | 701/209 |
| 5,150,295 | 9/1992 | Mattingly | 702/5 |

(List continued on next page.)

OTHER PUBLICATIONS

Frosh, Randy. "A Method of Accessing Large Spatial Databases", Nov. 26–30, 1989, GIS/LIS '89 Conference, Orlando, Florida.

Samet, Hanan. "Strategies for Optimizing the Use of Redundancy in Spatial Databases", Chapter 2.4, *The Design and Analysis of Spatial Data Structure*, ISBN 0–201–50255–0.

Bentley, Jon L.. "Multidimensional Binary Search Trees in Data Applications", IEEE Transactions on Software Engineering, vol. SE–5, No. 4, Jul. 1979, pp. 333–340.

Declaration Regarding Toolkit Software by Vijaya Israni.

*Primary Examiner*—Paul R. Lintz
*Attorney, Agent, or Firm*—Frank J. Kozak; Lawrence M. Kaplan

[57] ABSTRACT

An improved method and system that provides for a data access interface layer in a navigation system. The navigation system is of the type that includes a navigation application software program that provides navigating features to a user of the system and a geographic database stored on a computer-readable storage medium wherein the geographical database includes information relating to the geographical region about which the navigation system provides the navigation features to the user. The data access interface layer is preferably stored in the navigation system as a library of software functions. The data access interface layer operates in conjunction with the navigation system application software. The data access interface layer isolates the navigation application software from the geographic data which are stored on the storage medium. The data access interface layer intercepts requests by the navigation application software for geographic data. The data access interface layer retrieves geographic data from the storage medium and converts the data into a format usable by the navigation application software. The data access interface layer also provides for memory management that facilitates accessing and using geographic data from the particular storage medium quickly and efficiently. By recognizing that different media types have different physical formats, the data access interface layer accommodates and isolates the differences so that the portions of the data access interface layer that interact with the navigation application software can be generic.

50 Claims, 6 Drawing Sheets

Microfiche Appendix Included
(13 Microfiche, 1215 Pages)

U.S. PATENT DOCUMENTS

| | | | |
|---|---|---|---|
| 5,168,452 | 12/1992 | Yamada et al. | 701/202 |
| 5,170,353 | 12/1992 | Verstraete | 701/202 |
| 5,235,701 | 8/1993 | Ohler et al. | 707/1 |
| 5,285,391 | 2/1994 | Smith, Jr. et al. | 701/200 |
| 5,295,261 | 3/1994 | Simonetti | 707/2 |
| 5,359,527 | 10/1994 | Takanabe et al. | 701/209 |
| 5,406,493 | 4/1995 | Goto et al. | 701/208 |
| 5,412,573 | 5/1995 | Barnea et al. | 701/211 |
| 5,592,665 | 1/1997 | Lahaije | 707/4 |
| 5,617,319 | 4/1997 | Arakawa et al. | 701/207 |
| 5,694,534 | 12/1997 | White, Jr. | 345/440 |
| 5,754,846 | 5/1998 | Janse | 707/100 |
| 5,815,161 | 9/1998 | Emmerink | 345/440 |
| 5,832,406 | 11/1998 | Iwami et al. | 701/202 |

INTERFACE LAYER FOR NAVIGATION SYSTEM

REFERENCE TO RELATED APPLICATIONS

The present application is related to the cop ending application entitled "IMPROVED SYSTEM AND METHOD FOR USE AND STORAGE OF GEOGRAPHIC DATA ON PHYSICAL MEDIA", Ser. No. 08/740,295, now pending, assigned to the assignee of the present application, filed on even date herewith, the entire disclosure of which is incorporated by reference herein.

REFERENCE TO MICROFICHE APPENDIX

Included with and forming part of this specification is a microfiche appendix, Appendix A, including 12 sheets of 1158 total frames and a second microfiche appendix, Appendix B, including 1 sheet of 57 total frames.

REFERENCE TO COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present application relates to navigation systems and in particular, the present application relates to a navigation system interface layer that facilitates use and access of a geographic database stored on a physical storage medium.

Computer-based navigation systems for use on land have become available in a variety of forms and provide for a variety of useful features. One exemplary type of navigation system uses (1) a detailed data set of one or more geographic areas or regions, (2) a navigation application program, (3) appropriate computer hardware, such as a microprocessor, memory, and storage, and, optionally, (4) a positioning system. The detailed geographic data set portion of the navigation system is in the form of one or more detailed, organized data files or databases. The detailed geographic data set may include information about the positions of roads and intersections in or related to one or more specific geographic regional areas, and may also include information about one-way streets, turn restrictions, street addresses, alternative routes, hotels, restaurants, museums, stadiums, offices, automobile dealers hips, auto repair shops, etc.

The positioning system may employ any of several well-known technologies to determine or approximate one's physical location in a geographic regional area. For example, the positioning system may employ a GAPS-type system (global positioning system), a "dead reckoning"-type system, or combinations of these, or other systems, all of which are well-known in the art.

The navigation application program portion of the navigation system is a software program that uses the detailed geographic data set and the positioning system (when employed). The navigation application program may provide the user with a graphical display (e.g. Ea "map") of the user's specific location in the geographic area. In addition, the navigation application program may also provide the user with specific directions to locations in the geographic area from wherever the user is located.

Some navigation systems combine the navigation application program, geographic data set, and optionally, the positioning system into a single unit. Such single unit systems can be installed in vehicles or carried by persons. Alternatively, navigation application programs and geographic datasets may be provided as software products that are sold or licensed to users to load in their own personal computers. In further alternatives, the navigation system may be centrally or regionally located and accessible to multiple users on an "as needed" basis, or alternatively, on-line via a network or communications link. Personal computer-based systems may be stand-alone systems or may utilize a communication link to a central or regional or distributed system. Also, users may access a navigation system over an on-line service such as the Internet, or over private dial-up services, such as CompuServe, Prodigy, and America Online. In-vehicle navigation systems may use wireless communication connections. Navigation systems may also be used by operators of vehicle fleets such as trucking companies, package delivery services, and so on. Navigation systems may also be used by entities concerned with traffic control or traffic monitoring.

Computer-based navigation systems hold the promise of providing high levels of navigation assistance to users. Navigation systems can provide detailed instructions for travelling to desired destinations, thereby reducing travel times and expenses. Navigation systems also can provide enhanced navigation features such as helping commuters and travellers avoid construction delays and finding the quickest routes to desired destinations. Navigation systems can also be used to incorporate real-time traffic information.

In order to provide these useful and enhanced features in a navigation system, there is a need to gather and organize comprehensive, detailed, reliable, and up-to-date data about geographical regions and areas. There is also a need to continuously update the geographic data since many data can rapidly become out-of-date. Presently, the collection of such geographic data and the provision of such data in a computer-usable format are provided by Navigation Technologies of Sunnyvale, Calif.

One potential problem associated with providing enhanced features and updated geographic databases for navigation systems is that there are numerous different navigation system platforms. These platforms may have different hardware, navigation software, operating systems, and so on. Many of these different platforms have developed independently and are incompatible with each other. Thus, even if it were possible to gather updated geographic data and produce an updated computer-readable geographic database, it becomes difficult to provide and distribute geographic databases that can be used with the various different types of navigation system platforms due to the numerous different platforms that exist. This problem may be exacerbated in the future as navigation system manufacturers develop new generations of navigation systems with more and enhanced features.

Another problem exists with regard to providing updated geographic data for existing navigation systems. Just like conventional printed maps, geographic information used in computer-based navigation systems can become out-of-date. For example, new roads are built, businesses change locations, road construction closes roads, detours are established, museum and restaurant hours change, etc. It is expected that end-users, such as vehicle owners who have navigation systems in their vehicles, will want to have the geographic data in their navigation systems updated from time to time.

The proliferation of multiple, different, incompatible navigation system platforms, mentioned above, also presents an obstacle to providing updated geographic data for end-users, i.e. the persons and businesses who own and use navigation systems. In order to provide updated geographic data for an end-user's navigation system over the lifetime of the navigation system, the provider of geographic data needs to provide a product that not only has updated geographic data, but also that is compatible with the user's particular navigation system. Over the expected lifetime of navigation systems, which may be ten years or more, this would require supporting a growing number of old, incompatible navigation systems and platforms. If specialized versions of updated geographic data products had to be produced for each separate, different type or version of navigation platform, the number of different products would continue to increase over time thereby making the provision of updated geographic data products to end-users difficult and expensive.

Accordingly, it is an object of the present invention to provide a solution to the problem of providing geographic data for a variety of hardware platforms.

Further, it is an object of the present invention to provide an improved navigation system and geographic navigation database(s) for use therein, that can be efficiently developed, manufactured, customized, distributed, and/or updated across a variety of navigation system platforms, operating systems, and releases.

SUMMARY OF THE INVENTION

To achieve the foregoing and other objectives and in accordance with the purposes of the present invention, there is provided an improved method and system for a data access interface layer in a navigation system. The navigation system is of the type that includes a navigation application software program that provides navigating features to a user of the system and a geographic database stored on a computer-readable storage medium wherein the geographical database includes information relating to the geographical region about which the navigation system provides the navigating features to the user. The data access interface layer is preferably stored in the navigation system as a library of software functions. The data access interface layer operates in conjunction with the navigation system application software. The data access interface layer isolates the navigation application software from the geographic data which are stored on the storage medium. The data access interface layer intercepts requests by the navigation application software for geographic data. The data access interface layer retrieves geographic data from the storage medium and converts the data into a format usable by the navigation application software. The data access interface layer also provides for memory management that facilitates accessing and using geographic data from the particular storage medium quickly and efficiently. By recognizing that different media types have different physical formats, the data access interface layer accommodates and isolates the differences so that the portions of the data access interface layer that interact with the navigation application software can be generic.

DETAILED DESCRIPTION OF THE PRESENTLY PREFERRED EMBODIMENTS

I. Overview of Navigation System

Figure 1:
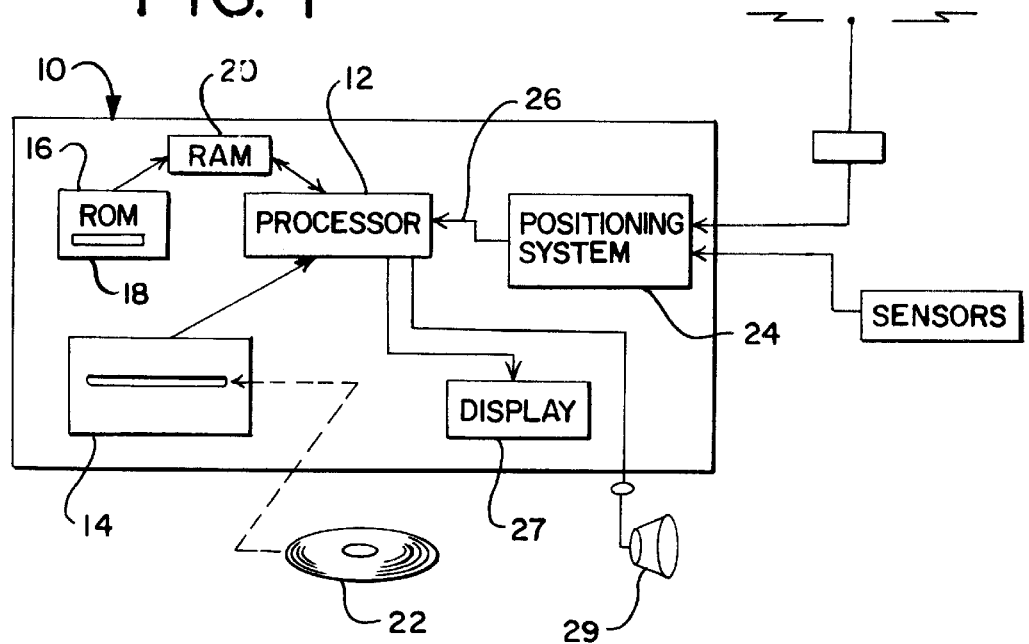
FIG. 1 is a diagram illustrating a navigation system including a storage medium upon which geographical data, and optionally other data, are stored.

Referring to FIG. 1, there is a diagram illustrating an exemplary configuration of a navigation system 10. The navigation system 10 is a combination of hardware and software components. In one embodiment, the navigation system 10 includes a processor 12, a drive 14 connected to the processor 12, and a memory storage device 16, such as a ROM, for storing a navigation application software program 18. The navigation application software program 18 is loaded from the ROM 16 into a memory 20 associated with the processor 12 in order to operate the navigation system. The processor 12 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable. A storage medium 22 is installed in the drive 14. In one present embodiment, the storage medium 22 is a CD-ROM. In another alternative embodiment, the storage medium 22 may be a PC Card (PCMCIA card) in which case the drive 14 would be substituted with a PCMCIA slot. Various other storage media may be used, including fixed or hard disks, DVD (digital video disks) or other currently available storage media, as well as storage media that may be developed in the future. The storage medium 22 includes geographic data, as described more fully in the cop ending application entitled "IMPROVED SYSTEM AND METHOD FOR USE AND STORAGE OF GEOGRAPHIC DATA IN PHYSICAL MEDIA", referenced above.

The navigation system 10 may also include a positioning system 24. The positioning system 24 may utilize GAPS-type technology, a dead reckoning-type system, or combinations of these, or other systems, all of which are known in the art. The positioning system 24 outputs a signal 26 to the processor 12. The signal 26 may be used by the navigation application software 18 that is run on the processor 12 to determine the location, direction, speed, etc., of the navigation system 10. The navigation system 10 uses the geographic data stored on the storage medium 22, possibly in conjunction with the output 26 from the positioning system 24, to provide various navigation application features. These navigation application features may include route calculation, map display, vehicle positioning (e.g. map matching), maneuver generation (wherein detailed directions are provided for reaching a desired destination), and other features. These navigation application features are provided by navigation application programs (i.e. subprograms or functions) that are part of the navigation application software program 18. The navigation features are provided to the user (e.g., the vehicle driver) by means of a display 27, speakers 29, or other means.

Figure 2:
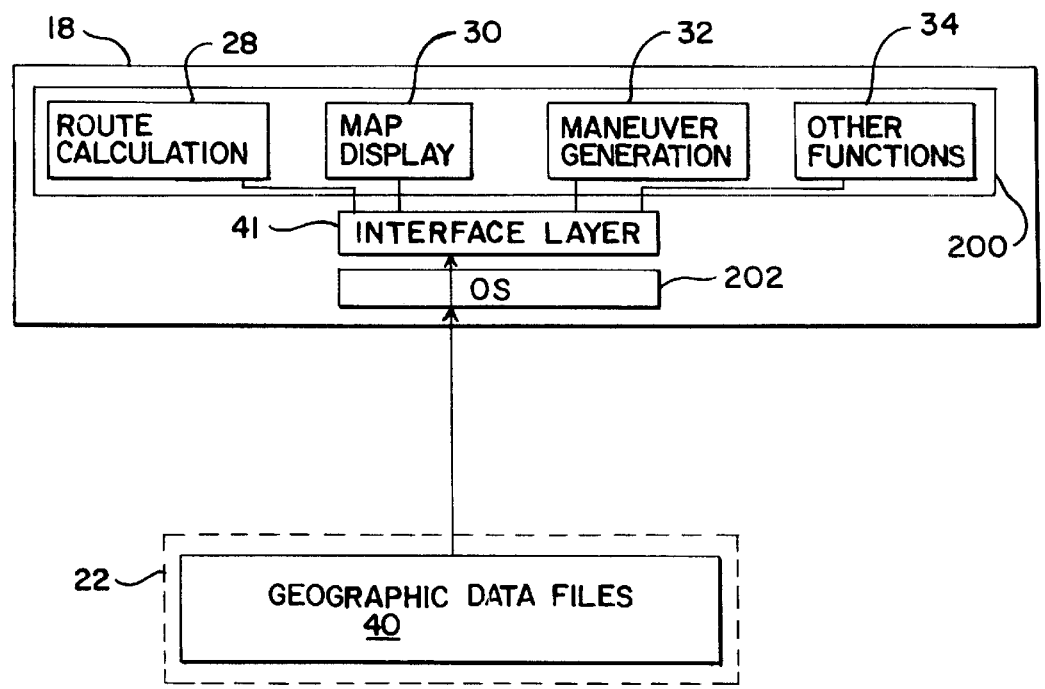
FIG. 2 is diagram illustrating the software components in the navigation system of FIG. 1.

Referring to FIG. 2, the navigation application software program 18 includes separate applications (or subprograms) 200. The navigation application programs 200 of the navigation system 10 may be regarded as including route calculation functions, maneuver generation functions, map display functions, vehicle positioning functions, destination resolution capabilities, and so on. FIG. 2 shows these separate navigation applications 200 including a route calculation function 28, a map display function 30, a maneuver generation function 32, and other functions or subprograms 34. Although these navigation application subprograms are represented as separate functions or applications within the navigation application software program 18, these functions may be combined and provided as a single program.

In FIG. 2, the storage medium 22 is shown to have geographic data 40 stored on it. The geographic data 40 are in the form of one or more computer-readable data files or databases. The geographic data 40 may include information about the positions of roads and intersections in or related to a specific geographic regional area, and may also include information about one-way streets, turn restrictions, street addresses, alternative routes, hotels, restaurants, museums, stadiums, offices, automobile dealers hips, auto repair shops, etc. The geographic data 40 are organized in a format and stored on the storage medium 22 in a manner that facilitates use and access by the navigation application functions 200 of the navigation application program 18. The organization and storage of the geographic data 40 are described in more detail in the above referenced cop ending application entitled "IMPROVED SYSTEM AND METHOD FOR USE AND STORAGE OF GEOGRAPHIC DATA ON PHYSICAL MEDIA."

The various separate navigation applications 200 of the navigation application software 18 access and read portions of the geographic data 40 from the storage medium 22 in order to provide useful navigation features to the user of the navigation system 10. In a present embodiment, a data access interface layer 41 is located between the various navigation applications 200 (such as the functions 28, 30, 32, and 34) and the geographic dataset 40. The data access interface layer 41 isolates the navigation application functions 200 from the formatting, storage, and other details of the geographic data 40. Accordingly, the data access interface layer 41 provides for various different navigation system platforms to use a common geographic database product, i.e. the geographic dataset 40 stored on the storage medium 22. In addition, the data access interface layer 41 facilitates allowing an end-user to update the geographic data in the end-user's navigation system.

II. Data Access Interface Layer-Overview

The data access interface layer 41 is a software component that may reside in the navigation system 10. In a preferred embodiment, at least a portion of the data access interface layer 41 is linked or compiled into the executable module that forms the navigation application software 18 in the navigation system 10 that is loaded into the memory 20 (FIG. 1) from the ROM 16 when the navigation system 10 is operated. Within the data access interface layer 41 there are several subsystem components. There are internal interfaces between these subsystem components and external interfaces to the navigation application software components 200 and operating system 202 of the navigation system 10. Data are presented to the navigation applications as logical data entities. The logical data model entity records are fixed length and contain decompressed data without any of cross-reference information.

In a preferred embodiment, the data access interface layer 41 is provided in the form of a library of software functions. This library of functions provides data access for use by the various components or subprograms 200 of the navigation application software program 18. In one preferred embodiment, some or all of these library functions are directly linked to the various navigation applications 200 to form the navigation software product 18. Thus, the data access interface layer 41 is incorporated into the navigation application software of the navigation systems of OEM's (original equipment manufacturers) or aftermarket automotive navigation systems, which use a separately stored geographic database. In alternative embodiments, discussed below, the data access interface layer 41 may be incorporated into other-than-in-vehicle navigation systems.

Source code for the library of software functions that forms the interface layer is included in the microfiche appendix, Appendix A, included as part of this specification. Additional source code representing alternative preferred embodiments of some of these files of source code are included in Appendix B that is a part of the disclosure of this specification. In a preferred embodiment, the source code is written in the C programming language, although in alternate embodiments, other languages may be used.

Because the data access interface layer 41 is used with various different navigation systems, the interface layer 41 takes into account differences among these systems. Some in-vehicle navigation systems have relatively small quantities of RAM, slow I/O devices, and proprietary and/or real-time-oriented operating system kernels. Some of these navigation systems calculate an optimal route and provide real-time, turn-by-turn guidance to the end-user. Accordingly, it is advantageous to integrate various position and heading sensor information in real-time and in the background. Some of these navigation systems also provide cartographic display, a flexible capability to obtain route destination points, and an interface oriented to in-vehicle ergonomics.

As mentioned above, the data access interface layer 41 isolates the navigation application software 18 from the size, complexity, and evolution of the geographic map database 40 on the physical medium 22. In a preferred embodiment, similar or identical data access interface layers can used by different navigation systems. The data access interface layer 41 is portable across different hardware platforms. The data access interface layer 41 provides versatility to support most or all envisioned navigation application functionality for a wide range of product capabilities and hardware platforms. In a preferred embodiment, the software library that comprises the data access interface layer uses less than 256 Kbytes of memory and 16 Kbytes of stack memory, and at least 256 Kbytes of heap memory.

As mentioned above, the geographic data 40 is stored on the storage device 22, such as a CD-ROM. In a preferred embodiment, the geographic data is stored using some or all of the physical storage format features disclosed in the above referenced cop ending application entitled "IMPROVED SYSTEM AND METHOD FOR USE AND STORAGE OF GEOGRAPHIC DATA IN PHYSICAL MEDIA." The features used in the physical storage format provide for efficient access to the geographic data and associated third party data ("TPD"). Different types of storage media have distinct data capacities and access characteristics. Accordingly the physical storage format features disclosed in the cop ending application account for the various media intended for use in navigation systems. Although the present embodiment of the data access interface layer 41 uses the physical storage format disclosed in the cop ending application, some or all of the features of the data access interface layer disclosed herein may be used with other formats.

As described in the cop ending application, the geographic data are stored on the medium by means of a geographic dataset compiler. The compiler accepts geographic data and associated third party data in an interchange format. The geographic data and third party data are input to the compiler which generates an output in the form of an appropriate physical storage format. The geographic data may be published by Navigation Technologies of Sunnyvale, Calif.

Figure 3:
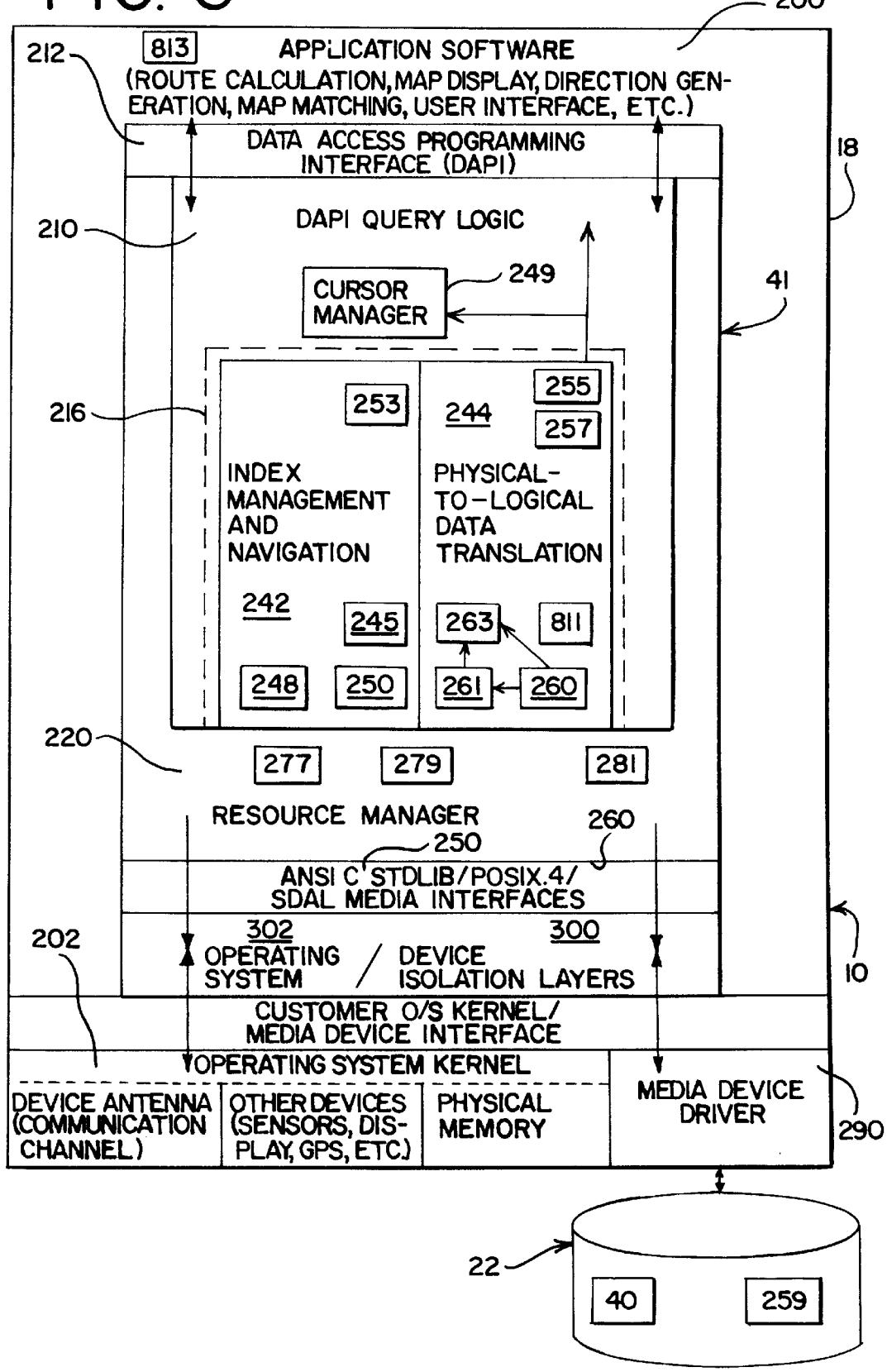
FIG. 3 is a block diagram illustrating the software components of the navigation system of FIG. 1 including the major systems of the interface layer of FIG. 2.

FIG. 3 is a block diagram of the navigation system 10 showing components of the data access interface layer 41. In FIG. 3, the data access interface layer 41 is shown in the navigation application software 18 logically below the navigation application programs 200 and above the operating system 202. This allows the data access interface layer 41 to be responsive to data access requests from the various navigation application software programs 200.

The software library that forms the data access interface layer 41 may be regarded as being composed of three major subsystems. The topmost subsystem is the data access programming interface query logic ("DQL" or "query logic") subsystem 210. The query logic subsystem 210 provides a function call interface 212 to the navigation application software programs 200. The data access interface layer 41 defines a data structure view (referred to as the "Logical Data Model" or "LDM") of the geographic data 40 on the storage medium 22 to the navigation application programs 200.

In a presently preferred embodiment, the data structure view defined by layer 41 is in the C-language. As mentioned above, the logical data model represents the entities in fully decompressed form. The entities in the logical data model form are not compacted. Although this results in wasted space within data entities, it facilitates immediate use of the data entities by the navigation application. Each of the data entities of a given type may have a fixed, known predetermined size. Also, in a preferred embodiment, entities in a logical data format include no cross-reference information or other types information that require processing before the data can be used by the navigation application.

The query logic subsystem 210 includes a set of function calls that allow the navigation application programs 200 to request a particular set of entities in the logical data model format. The query logic subsystem 210 also implements the logic that locates the requested entities and manages the resulting data set which is then returned to the requesting component of the navigation application programs 200.

The query logic subsystem 210 resolves data access queries in terms of subdivisions of the physical media, called "parcels", which contain the requested data in the physical storage format of the geographic data 40 on the medium 22. The query logic subsystem 210 also provides for management of the query result set, which can be expressed in terms of a "cursor" for those queries that can return more than one record. The cursor is a construct that allows the navigation application programs to access parts of a large query result set without requiring an in-memory copy of each record in translated logical data model form.

Below the query logic subsystem 210 is an index management and data translation (IMN) subsystem 216. The index management and data translation subsystem 216 provides several separate functions. The first function uses index information to locate data for physical entities stored on the medium as directed by the query logic subsystem 210. A second function provided by the index management and data translation subsystem 216 is to unpack or otherwise decompress the optimized entities and to transform the entities into the logical data model data entities that are returned to the requesting navigation application program 200. Where the geographic data 40 stored on the medium are packed or compressed, the second function provided by subsystem 216 also serves to unpack or otherwise decompress the optimized physical entities so that they may be transformed to the logical data model format. Another function provided by the index management and data translation subsystem is the provision for forward/backward compatibility across different versions, as explained further below.

Below the index management and data translation subsystem 216 is the resource management subsystem 220. As mentioned above, in some navigation systems, the amount of memory is relatively small and the I/O bandwidth is relatively low. Conventional techniques for the management of these resources may be limited. For example, one approach used in some navigation systems to solve performance problems due to slow I/O is to use memory to cache data, thereby minimizing physical I/O. But memory in these types of navigation systems may be limited as well, particularly where multiple functions of the navigation application 200 may need to operate concomitantly.

An improved approach to resource management is provided by the present embodiment. In the present embodiment, the data access interface layer 41 is provided with its own resource management subsystem 220 that is separate from any resource management function provided by the navigation application programs 200. The interface layer 41 is provided with a portion of the navigation system memory for its exclusive use and which is managed by the resource management subsystem 220. In addition, the resource management subsystem 220 has the capability to use additional portions of navigation system memory when they are not needed by the navigation application programs. The resource management subsystem 220 provides for improved management of memory and I/O by focussing on data access requirements of the query logic subsystem taking into account the specific data organization of the physical storage format. The resource management subsystem 220 mediates access to cache memory buffers and the physical I/O channel for data access tasks. Management of these resources also benefits from coordination of actions and data needs above the level of the data access interface layer 41, i.e. in the software of the navigation application programs 200. The data access needs of the navigation application programs 200 are used to help determine which data to retain in cache memory. An advantageous way to provide this information to the resource management subsystem 220 is through additional access program parameters that allow the data access interface layer 41 to prepare data in the background for anticipated future use. This is in addition to data access calls where the navigation application program waits for immediately required data. In addition, the resource management subsystem 220 may accept parameters that allow for controlling the order of data access from the physical medium.

Each of these interface layer subsystems is discussed in more detail below.

III. Query Logic (DQL) Subsystem 210

The query logic subsystem 210 represents one level of the software library that forms the data access interface layer 41. The query logic subsystem 210 implements an interface 212 to the navigation application programs 200 by providing a view of the geographic database to the navigation application 200. In a present embodiment, the data access interface 41 provides for data access. The data access interface 41 defines a set of C-language data structures (the logical data model) and a set of function calls that deliver these logical data model entities to the navigation application software programs 200, which use the function calls to access the geographic data. (Although a preferred embodiment of the data interface layer 41 is defined as C-language structures, the interface layer could be defined in any suitable programming language). In a preferred embodiment, each of the data access interface layer function calls made by the navigation application programs is implemented as a wrapper around a corresponding function call in the query logic subsystem 210.

In general, the query logic subsystem 210 provides three kinds of data access capability to the navigation application programs. One kind of data access provided by the query logic subsystem allows the navigation application programs to request a particular data entity by its database identifier (DBID). The query logic system 210 provides the requested data entity to the navigation application in the logical data model format. Another kind of data access provided by the query logic subsystem 210 allows the navigation applications to request a set of data entities that are related to a particular data entity. The query logic subsystem provides the navigation application with a cursor (explained in more detail below) to the resultant set of data entities. Some or all of the data entities in the resultant set may be in the logical data format. A third kind of data access provided by the query logic subsystem allows the navigation application to obtain data based upon a search request. The query logic subsystem returns a cursor to a resultant set of data entities that match the search criteria.

The functions that form the interface 212 allow the navigation application programs 200 to request a particular entity or a group of entities (such as "nodes", "places", "segments", "points of interest", "postal codes", and so on) which can be qualified by a particular subset of attributes (such as "all segments that have an end point at node X", or "all municipalities including the word "Lake" in name, and so on) which are either directly a part of or are otherwise closely associated with the entity. Alternatively, these requests can also be qualified by geographical parameters or attributes, such as all segments within a specified rectangular area or inside a particular named place. The geographic qualifiers can be applied to the primary map data entities and can be useful for narrowing down a search for desired data.

The functions in the query logic subsystem 210 provide for pervasive access to data. This means that access to any and all logical data model entities is supported with a reasonable level of performance regardless of navigation application intent. For example, the route guidance software 28 (FIG. 2) may require access to point-of-interest data. Support for pervasive access to data occurs regardless of the classification of entities that occurs at the physical storage format level to optimize data access performance to the base set of entities required for important functions such as route calculation or map display. Pervasive access to data offers some synergy with the geographic query qualifiers. For example, rectangular queries are commonplace for geometric data such as segments or nodes, but are also useful for street names and points-of-interest.

The query logic subsystem 210 also includes the ability to initiate a data access transaction that is predictive in nature, e.g. where data are not required right away but are anticipated to be needed soon. This type of data access transaction preferably occurs in the background, allowing the navigation application programs to continue to perform work. As such, the query logic subsystem 210 provides the capability to make these predictive access calls in addition to normal access calls where the data are required immediately. This function coordinates with the navigation application programs 200 to predict what data may be required next.

Some of the query logic subsystem functions return a single entity or additional detail about a particular entity. However, others of the functions return an unpredictable number of entities. Depending on the particular query and the degree to which it is qualified, this number could potentially be quite large. For this reason, these query logic subsystem functions include a cursor management subsystem 249. A cursor is defined at the time of the query. The cursor forms a window (explained below) into an arbitrarily large result set built by the query. The cursor allows the navigation application to specify how many entities should be returned at a time when data are fetched through the cursor. General-purpose cursor management functions in the data access programming interface 212 allow the navigation application software programs 200 to subsequently move this window in a flexible and convenient manner.

A. Query Resolution

The data query logic subsystem 210 implements the interface to the navigation application programs 200 by resolving queries from the programs to a set of physical data subdivisions, called parcels, which exist on the media. These parcels may contain spatially-organized data, non-spatial data, index information, or other data. Once parcels are identified in response to a query, they are read into memory. The data within a parcel may be further organized into subsets to minimize the amount of data that need to be examined in a parcel to resolve a query. The appropriate parcels or parcel data subsets are identified and entities are located within those parcels or parcel data subsets in order for the data query logic subsystem 210 to build a cursor result set for a particular request. Alternatively, a single logical data record may be returned directly to the navigation application software programs 200 for simpler queries which always return a single record and which do not require construction of a cursor. However, both of these approaches locate and obtain one or more physical parcels, which ultimately reside in the physical storage format on the storage medium 22, and physically examine some subset of the parcel data to locate the entities that make up the result set. Once the result set is identified, the entities are transformed into the logical data model format and returned to the navigation application software programs 200.

Resolving queries requires information about the particular physical storage format used on the storage medium 22. The data access interface layer 41 isolates the parts of its software library that are dependent upon the specific physical storage format allowing other components of its library to be independent of a particular physical format. The components that are dependent upon the storage format are included in the index management and data translation subsystem 216. This subsystem 216 includes two further subsystems: the index management and navigation subsystem 242 and the physical-to-logical data translation subsystem 244.

At least two approaches are used to minimize accesses to the physical medium. One approach is to use index information within parcels to look up data. Another approach is to use data entity ID's that explicitly identify the parcel in which the data entity is located. (This latter approach is described in more detail in the above-referenced cop ending application.) Both index information and explicit data entity ID's are used to resolve a query to the parcel, subdivision of a parcel, or record level. The location and type of index information that is available depend on the physical storage format. It follows also that the algorithm for navigating the index also depends on the physical storage format. The function for navigating the index on the physical medium is included in the index management and navigation subsystem 242. Similarly, the transformation of compressed data from the format on the physical media into a form amenable for query resolution and translation to the logical data model format for return to the navigation application program is included in the physical-to-logical data transformation subsystem 244.

The query resolution process provided by the query logic subsystem 210 depends for data access upon the format-dependent services provided by the index management and navigation subsystem 242 and the physical-to-logical subsystem 244. This allows the implementation of the query logic subsystem 210 to be generic and independent of the physical storage format. The query resolution process also makes use of lower-level services to obtain parcels from the physical medium or cache memory and to obtain private dynamic memory buffers. These services are provided by the resource management subsystem (SRM) 220. The index management and navigation subsystem 242, the physical-to-logical subsystem 244, and the resource management subsystem 220 build a foundation for the query resolution process and appear logically below the level of the data query logic subsystem 210 in FIG. 3. This layered approach defines additional interfaces between the data query logic subsystem 210 and both the index management and navigation subsystem 242 and the physical-to-logical subsystem 244.

One interface 248 in the index management and navigation subsystem 242 takes an index specifier and query parameters information from the data query logic subsystem 210 and returns a set of parcel identifiers. A parcel identifier is a format-specific construct for identifying the parcel that is related to the physical organization of the data in the physical storage format on the medium. The parcel identifiers are then passed to the resource management subsystem 220 to obtain a pointer to the physical parcel in memory. Another interface 250 in the index management and navigation subsystem 242 provides for the translation from a specific entity identifier passed by the navigation application program 200 via the data query logic subsystem 210 to an identifier for the parcel which contains that entity. To further resolve a query to a particular parcel data subset or record, additional interfaces 253 between the data query logic 210 and index management and navigation subsystem 242 are required. The query parameters passed via this interface 253 are used by the index management and navigation subsystem 242 to navigate the internal index of the parcel (i.e. the index for the parcel data subsets) to locate the corresponding parcel data subset or record.

When internal index information is not present to resolve a query to a particular entity or set of entities within the parcel, a brute-force record inspection or binary search techniques are provided at the level of the data query logic subsystem 210. When these approaches are used, the entities are represented in an decompressed intermediate format ("DIF") that allows attribute values to be examined in a form that is independent of the physical storage format.

The decompressed intermediate format is independent of the physical storage format, which may vary in different types of media. In a preferred embodiment, the intermediate format is also independent of any changes to the version level of the physical format. This independence allows the query logic subsystem 210, which is the primary client of the physical-to-logical subsystem 244, to examine and understand data in this representation to resolve queries. The decompressed intermediate format conversion interface is primarily record-based, with provisions for conversion within parcel subdivisions, if necessary. The conversion process may also use metadata tables (described below) to facilitate the translation to the decompressed intermediate format from newer physical storage format data specification levels.

The decompressed intermediate format exists to prevent the time and space overhead required to maintain records in full logical data model format. Entities in logical data model format are much larger in size than in the corresponding decompressed intermediate format. Logical data model entities are fixed-sized entities that are known to the application software and returned from the query logic system 210 through the interface 212. Deferring conversion from intermediate to logical data model format to only those records that are returned to the navigation application minimizes the amount of memory and conversion overhead required for entities that do not satisfy a particular query. There is a one-to-one relationship between decompressed intermediate format and logical data model entity types.

The transformation into the decompressed intermediate format relies on an interface 257 provided by the physical-to-logical subsystem 244. This utilizes the intermediate format which localizes all data corresponding to an entity within the same parcel. The amount of memory required to hold the data in this intermediate format is preferably smaller than the amount of data that would be necessary to hold the same data entities in the logical data model format. Finally, when entities that comprise the result set have been identified by the query resolution logic, another physical-to-logical interface 255 is available to translate the data to the logical data model format for return to the navigation application programs 200.

B. Cursor Management

The query result from the data access interface layer 41 is copied into memory buffers provided by the navigation application software programs 200 regardless of whether or not cursors are involved. This allows the data access interface layer 41 to compress (i.e. compact) the memory allocated to it in its memory pool without affecting the navigation application programs 200. The cursor management subsystem 249, mentioned above, is part of the query logic subsystem 210. When a cursor-based query call is invoked in the data access interface layer 41, an internal cursor is constructed by the cursor management subsystem 249 and a unique reference to the cursor is returned to the one of the navigation application programs 200 that requested the data. The cursor reference is used to obtain all or some portion of the resulting data. When data are obtained via a cursor, the navigation application program 200 specifies a memory buffer in a size that is a multiple of the returned logical data model entity size. This multiple is based on how many records at a time the navigation application program prefers to (or can afford to) handle at one time. In a preferred embodiment, this technique is facilitated because the logical data model entities are of a known fixed size.

Figure 5A:
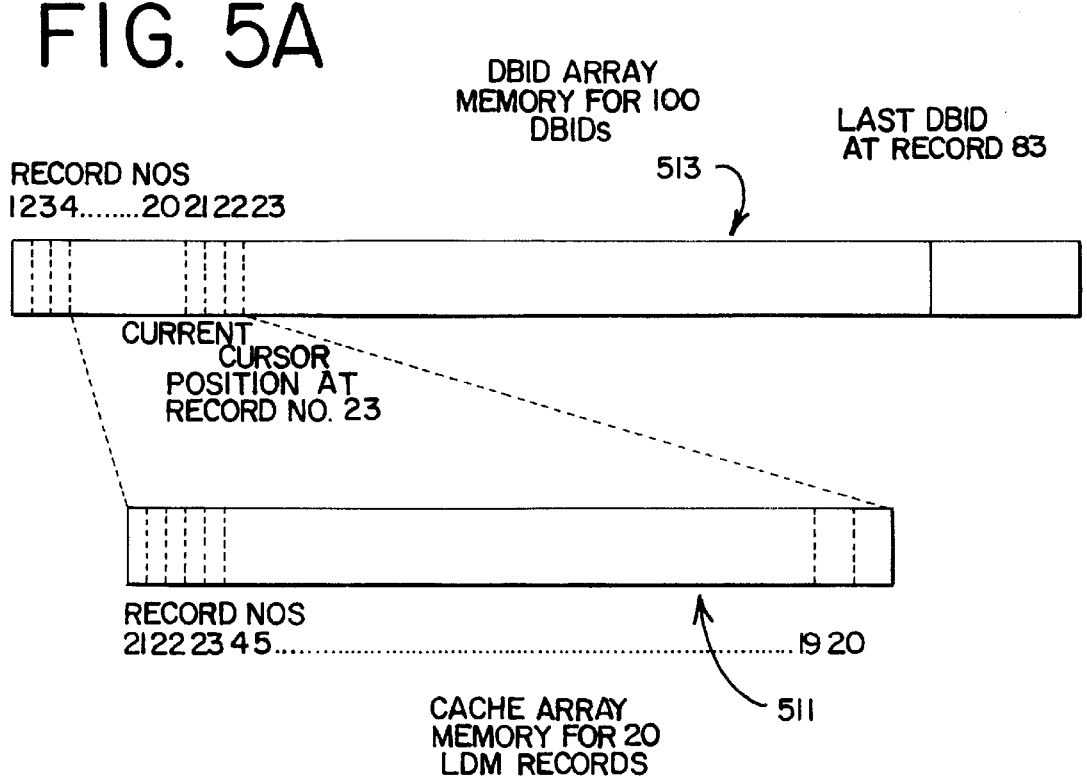
FIGS. 5A and 5B are illustrations representing memory storage during operation of the cursor management system shown in FIG. 3.

The cursor management subsystem 249 stores the entities that comprise the cursor result set in two different ways. Referring to FIG. 5A, some of the entities in the result set are saved in fully-translated logical data model form. Whether or not all entities in the set are maintained in the logical data model form depends on the number of entities that make up the query result set. For cases in which the result set size is below a first threshold, the entire set is maintained as an array 511 of decompressed logical data model entities. For cursors whose results set exceeds this first threshold, the remaining are maintained in a second array 513 that includes only entity identifiers. The entity identifier (which in many cases may be the database identifier, or "DBID") allows the record in the physical parcel to be quickly accessed for transformation into the logical data model format.

The memory used to maintain the cursor result set is dynamically allocated using the internal private dynamic memory management interface provided by the resource management subsystem 220, as explained further below. When very large result sets are encountered, a partial result set may be maintained if the number of entities satisfying the query exceeds yet another threshold. This second threshold is provided to minimize any possible adverse memory impact of a very large result set. Each of these thresholds may be configured at the time that the executable module 18 including the navigation application programs 200 and the data access interface layer 41 are compiled. The full or partial nature of a particular query is reported to the calling navigation application program 200 so that the number of records returned by the query can be properly interpreted.

When a partial result set is maintained for a reference cursor, the query resolution process temporarily comes to a halt once the maximum partial query limit is encountered. In order to continue the query at a later time, the cursor also maintains enough information to resume the query resolution process at the point it left off.

The cursor management subsystem 249 provides additional cursor functionality. Once a cursor is defined for a particular query, the cursor is positioned at the beginning of the result set. A "fetch next" cursor function fills the result buffer of the navigation application (specified in the query call which established the cursor) with the next N records and positions the cursor after the last record returned. The cursor is maintained as a "window" of logical data model records that moves across the result set, so that the cursor fetch process is simply a memory-to-memory copy from the cursor's address space internal to the data access interface layer 41 to the address space of the navigation application program 200.

Various forms of cursor manipulation functions are also provided by the cursor management subsystem 249 including the ability to reset the cursor position to the beginning, end, or an absolute position in the result set. A "get previous" cursor function is also provided to augment the "get next" functionality. The absolute positioning function is useful in the context of the result set record count returned by the query function which establishes the cursor.

IV. Index Management and Navigation (IMN) Subsystem 242

Referring again to FIG. 3, the index management and navigation subsystem 242 contains a portion of the physical format-specific index management and navigation software in the software library that forms the data access interface layer 41. The index management and navigation subsystem 242 allows the query logic subsystem 210 and the resource management subsystem 220, above and below the index management and navigation subsystem 242, respectively, to be independent of the physical storage format used on the medium.

Index information is used to resolve the location of a parcel which contains a desired entity or entities based on various search criteria. Indexes are also used in some cases to locate a particular data subset within a parcel. (An index which is used to resolve to a particular parcel may be regarded as an external index and an index used to resolve to a parcel internal subdivision may be regarded as an internal index because it is stored in the parcel.) External indexes are used to minimize or eliminate having to physically access parcels that may not contain the requested data. Both external and internal indexes also help to minimize the amount of decompression and translation that needs to occur in order to inspect candidate entities. Because various aspects of working with index information to resolve to the parcel, parcel data subset, or level are related to the specific physical storage format, this functionality is implemented within the format-specific index management and navigation subsystem 242.

Some of the characteristics of index information that depends on the particular physical storage format include the unique identifier for the parcel containing the root of the index on the physical media, what type of index is used, and whether the index resolves to the parcel, data subset parcel, or record level. Additionally, certain types of index information may exist on one type of storage format, but not on another. In order to maintain information about these index characteristics, a framework exists to maintain this information within the index management and navigation subsystem 242. This information may reside on the physical medium. This information may be read at initialization time and maintained in memory for use by index management and navigation subsystem 242.

This index information framework that maintains the details of the indexes present on the physical storage format includes a set of interfaces 245 that the data query logic subsystem 210 can use to obtain the information it needs to determine the optimum index to use based on the query parameters received via a call from the query logic subsystem 210. In a preferred embodiment, a minimum subset of indexes is provided, regardless of the physical storage format. Using a minimum subset of indexes minimizes unnecessary overhead in the query logic subsystem 210 that would result from a completely flexible set of indexing capabilities. The indexing information framework 245 also provides a structure upon the query parameter set that is passed to the index management and navigation subsystem 242 to resolve a query using a particular index. Finally, this framework is extensible, allowing new index types to be defined for future physical storage formats, and allows indexes to be defined in terms of entities and/or attributes that do not exist in current database versions or specifications.

Several different indexing schemes are used, depending on media size, media access characteristics, entity type, and the physical organization of a particular physical storage format. For example, a kd-tree, or variants thereof, is used for 2-dimensional resolution of spatial data, and a wide-and-shallow B-tree is used for certain nonspatial data in a physical storage format used for CD-ROM. The index management and navigation subsystem 242 implements the logic used to locate and navigate within these different types of index trees. For external index information, the leaf nodes of these trees specify a particular parcel identifier. For index information that is internal to a parcel, the leaf nodes instead specify a particular parcel data subset or record. Each unique type of index intended for use in the data access interface layer 41 is implemented within a separate module, preferably in C source code. This minimizes code size by reducing unnecessary code from being included when a particular indexing scheme is not used in a particular physical storage format.

Because external indexing information is stored in parcels on the physical media, the index management and navigation subsystem 242 uses the resource management subsystem 220 to physically read the index information from the storage medium into a memory buffer. In alternate embodiments, these index parcels may be retained in memory as the index navigation process proceeds, since it can be expected that some of these indexes will be reused within the same function call or even beyond it. For this reason, index parcels are retained in memory by the caching logic implemented by the resource management subsystem 220.

In one embodiment, when a task (such as a function in the query logic system 210) requires an index, the index management subsystem 242 first checks for the availability of the index. If the desired index is available, the index management system returns a message to the task indicating availability of the index and includes a handle for searching using the index. The handle includes a pointer which is called to perform searches using the index. The task obtains memory storage (as explained below) and constructs information for the key of the index. The task also obtains memory to hold the result of the index search.

V. Physical-to-Logical Data Translation (P2L) Subsystem 244

The physical-to-logical data translation (P2L) subsystem 244 includes the storage format-specific data translation software in the software library that forms the data access interface layer 41. This allows the data query logic subsystem 210 and the resource management subsystem 220 to be independent of the physical storage format.

An interface 260 for translation of an entity in the physical storage format form (which may be a compressed form) to the decompressed intermediate form is provided by the physical-to-logical subsystem 244. This interface 260 first decompresses the entity. This is followed by a metatranslation step 261, if necessary. The memory buffer used to hold the result is provided by the data query logic subsystem 210. The metatranslation step 261 can be bypassed when the version levels of the physical storage format and the intermediate decompressed format are equal for greater efficiency.

Once the data query logic subsystem 210 identifies an entity to be returned to the navigation application program 200, it uses an interface 263 in the physical-to-logical subsystem 242 that translates the entity from the decompressed intermediate form to the final logical data model form. For non-cursor single-entity queries, the calling navigation application program 200 supplies the memory buffer which holds the translated logical data model output. Otherwise, a dynamically-allocated private cursor memory buffer is supplied by the data query logic subsystem 210. Unlike the table-driven metatranslation process, the logical data model translation is coded into the physical-to-logical software implementation.

It may be desired for entities in the decompressed intermediate form to persist within or even across data access calls for subsequent repeated access. This could minimize the CPU overhead required to repeatedly perform decompression and metatranslation on the same data as well as minimize the memory management overhead involved with otherwise repeatedly allocating an output buffer. The management of this persistence is provided by the data query logic subsystem 210. This approach takes the anticipated CPU and memory savings into account, along with examination of data access patterns to determine how often repeated access to the same decompressed data occurs. The overall performance of the metatranslation process is also a factor in this analysis.

In an alternative embodiment, some data entities may undergo direct transformation from the physical storage format into the logical data model format without intermediate translation into the decompressed intermediate format.

Metatranslation describes the translation of data from the compressed physical storage format representation at some particular data version level (also referred to as a "specification level") to the intermediate decompressed representation known to the data query logic subsystem 210 at some other data version level. Metadata tables 259 are used to facilitate the transformation from one version level to another. The physical storage format metadata tables 259 are read off of the medium into semipermanently allocated memory at system initialization time. The metadata process is described more fully below.

VI. Resource Management (SRM) Subsystem 220

The resource management subsystem 220 provides access to memory and I/O resources for the software library that forms the data access interface layer 41. The resource management subsystem 220 manages the availability of navigation system memory and I/O resources for use by the data access interface layer 41 in a multi-tasking environment in which the navigation application programs 200 also contend for these resources. In a preferred embodiment, the resource management subsystem 220 does not manage memory and I/O resources for the navigation application software programs 200 for tasks other than accessing the geographical database via the interface layer 41.

There are two primary data access interfaces to the resource management subsystem 220. The first allocates and frees workspace memory from a pool that is reserved exclusively for use by the data access interface layer 41. The second interface specifies a parcel identifier and returns a pointer to a cache memory buffer that contains the parcel. The priority of the parcel can be specified, i.e. an indication of how soon (relatively) the parcel is needed. This feature enables prioritization of parcel I/O transactions and persistence of parcel data in cache when cache is in contention. When a requested parcel is not found in cache, a physical I/O transaction is initiated to read the parcel off the medium. There are additional interfaces in the resource management subsystem 220 that are used to allow the navigation application software 200 to adjust the resource management strategies at run time.

There are at least two approaches that the resource management subsystem 220 uses to increase performance. The first is to minimize and optimize I/O transactions within a constrained memory environment consisting of a portion of the navigation system's heap memory that is dedicated to the software library that forms the data access interface 41. The second is to manage access to this relatively small portion of memory. Memory management also includes methods for maintaining data in cache buffers to minimize I/O and for compacting of the dedicated heap memory. These approaches are achieved with small amounts of CPU and memory overhead. In order to implement these approaches, the physical organization of data on the storage medium, as well as the query optimization techniques implemented in the data query logic subsystem 210 and index management and navigation subsystem 242, is taken into account.

This resource management subsystem 220 works across a wide variety of media types, physical storage formats, operating system environments, and device driver capabilities. A variety of mechanisms are provided to optimize the resource management subsystem 220 for a particular navigation system platform and navigation software application. These mechanisms include the setting of configuration parameters at compile time. Also included are a set of function calls in the data access interface layer 41 that influence resource management behavior at run time. Additionally, the calls for data access are designed to take advantage of built-in resource management capabilities such as background data access. Further, the resource management subsystem provides for prioritization of requests for multiple parcels when more than one parcel is requested by a function (i.e. function level granularity), and alternatively the resource management subsystem can even provide for prioritization of requests for multiple parcels even when parcels are requested by more than one function.

Figure 4:
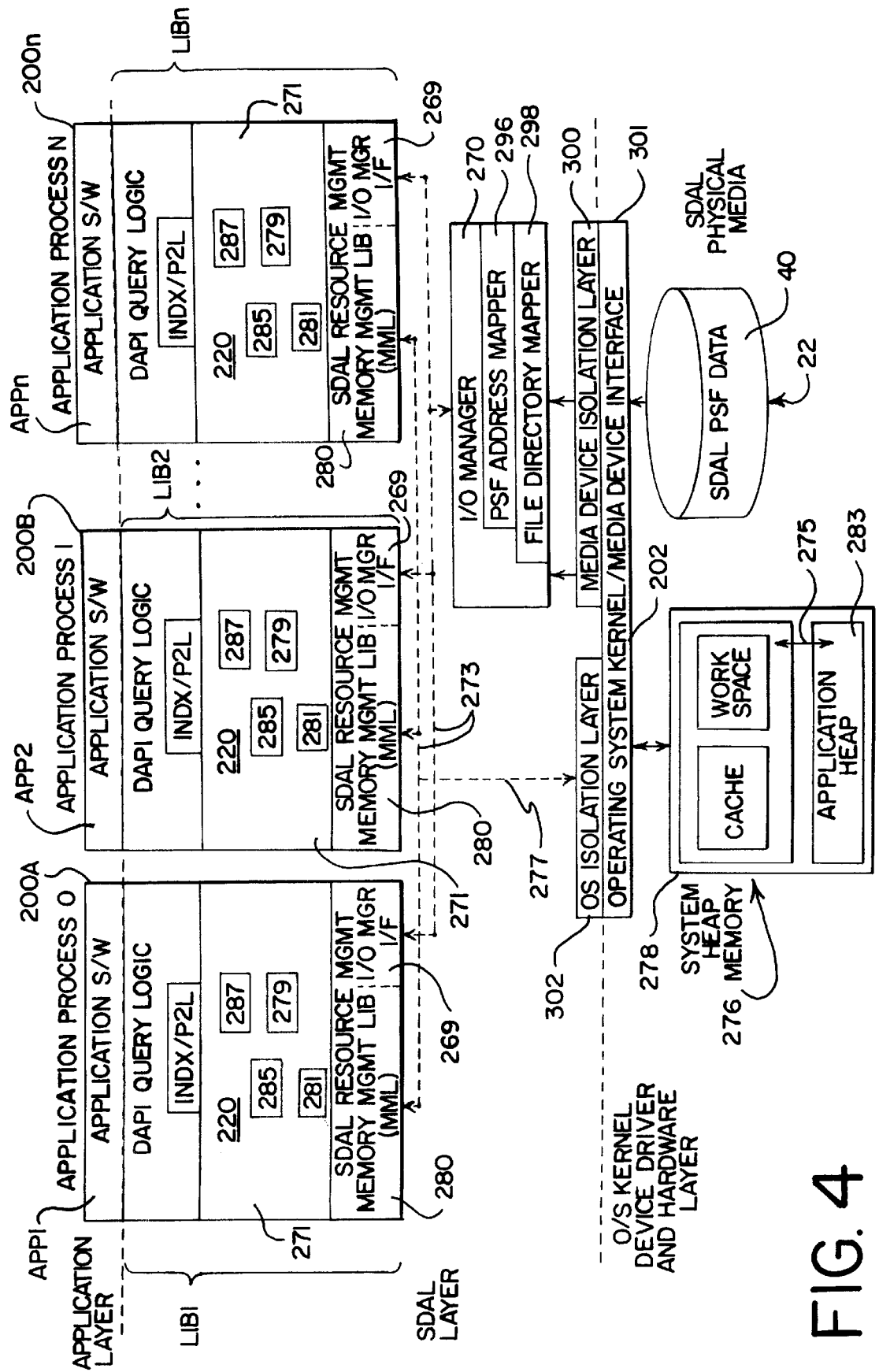
FIG. 4 is a block diagram illustrating one embodiment of the resource manager software architecture of FIG. 3.

FIG. 4 illustrates one embodiment of the interface layer 41 used in a multi-tasking environment in a navigation system. Each navigation application task, APP1, APP2 . . . APP*n*, that makes data access interface calls is linked with a interface layer software library, LIB1, LIB2 . . . LIB*n*, in shared code space. Each library implements the data query logic subsystem 210, the index management and navigation subsystem 242, and the physical-to-logical subsystem 244, as well as most (or all) of the resource management subsystem 220. As shown in the embodiment of FIG. 4, the I/O manager (IOM) portion 270 of the resource management subsystem 220 is implemented as a separate process from the rest of the subsystems (i.e. the data query logic subsystem 210, the index management and navigation subsystem 242, and the physical-to-logical subsystem 244, as well as most of the resource management subsystem 220) of the data access interface layer 41. This means that the I/O manager 270 may not be statically-linked with the application programs 200 as are the rest of the subsystems in the interface layer, but instead operates with each separate navigation processes, 200A, 200B, . . . 200*n*, via the linked portions of the interface layer in each process. This allows the I/O manager 270 to continue to process physical I/O in the background while these other tasks continue to run. This embodiment of the I/O manager 270 would be used in navigation systems that do not have a device driver that supports asynchronous I/O notification capability. However, an alternative embodiment of the I/O manager 270 may be used if the navigation system is of a type that includes a device driver that supports an asynchronous I/O notification capability. This alternative embodiment is described in more detail below.

A. Memory Management

As shown in FIG. 4, a portion 278 of the system heap memory 276 is allocated exclusively for use by the data access interface layer 41. The portion 278 is the interface layer memory pool. This memory pool 278 is separate from the portion 283 of the memory used by the navigation applications 200. The size of the memory pool 278 is determined by the navigation application program 200 through a call to the resource management subsystem 220 through the data access programming interface 212. The resource management subsystem 220 allows the navigation application program 200 to change the size of the pool 278 dynamically at run time (as illustrated by the arrow 275 between the two subdivisions). In one embodiment, the minimum size of the memory pool 278 is 256 Kbytes, with additional memory provided for CD-ROM media to increase the amount of data in cache.

The memory pool 278 is used by the data access interface layer 41 for a cache for parcels of varying size that are read from the physical medium as well as for a general-purpose heap that is private to the software library functions of the data access interface layer 41. Buffers allocated from this heap memory are used as general working space to hold decompressed data records and for cursor result sets.

The memory used for cache buffers tends to be larger and more uniform in size than memory allocated from the general-purpose private heap memory, which is typically smaller and more variably-sized. The management of cache buffers also takes into account the fact that a strategy for persistence is provided. Additionally, searching for a particular parcel in cache should incur as little overhead as possible.

These dissimilar yet overlapping memory management objectives are supported by a two-tiered approach. The first tier is responsible for the management of the more uniform and larger buffers which are suitable for parcel cache purposes. The second tier operates in terms of these larger buffers and divides them into smaller and less uniform pieces for general-purpose heap memory allocation. The cache buffer persistence strategy is implemented in terms of the first tier of memory buffer management.

Both tiers of memory management are performed by a memory management library ("MML" or "memory manager") 280. The memory management library 280 is part of the locally resident portion of the resource management subsystem 220 that is linked with the navigation application software 200 and runs as part of each of the navigation application processes. The memory management library 280 is a shared code library that uses mutual exclusion technique (described below) to allow multiple applications to have concurrent access to memory. For example, there may be multiple concurrent navigation application processes, such as processes 200A, 200B, . . . 200*n*. The memory management library 280 also implements the cache management process.

This two-tiered memory management architecture minimizes the amount of memory required for control structures used to keep track of internal memory allocation. These control structures, together with the cache management control structures, are resident in the memory pool 278 of the data access interface layer 41. Interprocess communication (IPC) techniques such as semaphore protection are used by the memory management library to serialize memory requests by arbitrating access to these control structures in a multi-tasking environment. This is illustrated by the dotted lines 277 connecting the memory management library 280 from each navigation application task, 200A-200*n*, to the memory pool 278.

Finally, a portion of the memory allocated from the memory pool 278 is used by the software library components of the data access interface layer 41. This portion of the memory pool is not shared (or otherwise returned) to the navigation application software program 200. This is facilitated by providing that the navigation application program 200 allocate its own private buffers to hold returned logical data model data entities. This isolation allows the resource management subsystem 220 to pursue compaction strategies to minimize fragmentation of the memory pool 278 without requiring the navigation application programs 200 to handle this memory management task.

B. Cache Management

Requests for data and index parcels are routed through the memory management library 280 in terms of a parcel identifier. A search for the parcel in cache memory is performed. A physical I/O request to the I/O manager 270 occurs when the parcel cannot be found in cache. Once the parcel is in cache memory, an interface 285 in the resource management subsystem 220 locks the parcel in the buffer when the buffer address is returned to the data query logic subsystem 210. This prevents the buffer from being swapped out when a data access interface call is active. An additional interface 279 of the resource management subsystem 220 releases this lock, and is called before the data access interface call returns control to the navigation application program. Swapping may occur when a large number of concurrent parcel requests causes the system to approach memory overcommitment.

The persistence strategy for the cached parcels is also implemented in the memory management library 280. This strategy takes buffer locks, priority, usage history, and usage counts into account in order to determine which buffers should be swapped out.

The navigation application software program 200 is in position to anticipate what data may be needed eventually versus what data are required immediately. In order to differentiate data access requests between immediately required data and data to prepare for subsequent access, the resource management subsystem 220 supports synchronous (i.e., waits for result in the foreground) and asynchronous (i.e., processing continues while I/O proceeds in the background) parcel requests. The asynchronous calls are used by "cache prepare" data access interface functions. An asynchronous request allows the navigation application program 200 to continue doing useful work while the I/O transaction proceeds in the background. An interface call 281 in the resource management subsystem 220 is also provided to allow the navigation application program 200 to cancel a asynchronous data request. In addition, a resource priority value is provided in each data access interface call to give even finer control to the navigation application program 200 to manage these foreground and background requests.

C. I/O Manager 270

In the embodiment shown in FIG. 4, the I/O manager 270 receives requests for physical I/O. These I/O requests originate with the synchronous and asynchronous "request parcel" interfaces 287 provided by the resource management subsystem 220 whenever the requested parcel cannot be found in cache memory. When this occurs, the memory management library 280 initiates an I/O request via the I/O manager interface 269 which results in an I/O transaction request being put into an I/O manager message queue. The I/O manager interface 269 is depicted in FIG. 4 in the statically-linked portion 271 of the resource management subsystem 220. In this case, contention to the I/O queue is managed using interprocess communication techniques such as message queues 273 connecting the I/O manager interface 269 to the separate I/O manager process 270. The message queues 273 provide a single point of event notification for each process (i.e. client). The message queues 273 may be used for notification of events, including I/O completion, memory allocation completion, or resource access allowance. Other events may also be supported. There is one client message queue for each process (i.e., client).

In a preferred embodiment, I/O transactions arriving via the queue 273 are received in terms of parcel identifiers. Also included may be an indication of the priority of the request, an identification of the task (client) making the request, an indication of a message queue used by the originator of the request. By using parcel identifiers, the memory management library 280 and the I/O manager 270 can remain independent of the physical storage format. Dependencies on the physical storage format in the resource management subsystem 220 are discussed below. Translation from parcel identifier to physical media address occurs for these I/O requests. When the I/O transaction is dispatched to the media device, the I/O manager 270 requests a cache buffer from the memory management library 280 to hold the data to be read from the media. This reduces interprocess communication overhead by preventing cancelled requests from needlessly requesting and releasing a buffer, and minimizes cache contention by allocating the buffer at the latest possible time.

There are two functions that the I/O manager 270 provides to enhance system performance. One function already mentioned is to allow physical I/O to occur in parallel with other activities. This allows other navigation application software functions 200 or data access interface layer software 41 to continue to run while a physical I/O transaction is in progress. The other function provided by the I/O manager 270 is a serialization function that allows incoming I/O requests to be reordered. This reordering is based on several factors, including the priority of the request, the physical location of the data on the media, the current read head position. Other factors may also be included. Note that even within a single transaction submitted by a single navigation application process, multiple parcels may be specified. This means that I/O reordering can result in increased performance even when only a single task is requesting data (i.e., "functional level granularity"). Additionally, because index and data information may appear redundantly, particularly for physical storage formats for media with relatively slow random access performance such as CD-ROM, the I/O manager 270 selects the closest of the redundant parcels to read. This feature is provided in part by the support for scattered reads provided by the I/O manager 270.

All of the reordering capabilities described above use the ability of the I/O manager 270 to maintain the current physical read head location. This is obtained from the media device driver 290 (FIG. 3). The I/O manager 270 also depends on the ability to obtain a physical media address (or addresses, for redundantly-placed parcels) from an "opaque" parcel identifier. (By "opaque" is meant that the I/O manager 270 can pass along the parcel identifier without knowing to what it specifically refers on the physical storage format medium.) The physical medium address depends on the physical storage format. These dependencies are isolated from the generic portion of the I/O manager 270 by two additional resource management components: a physical storage format address mapper (PAM) 296 and a file directory mapper (FDM) 298. Media device isolation is provided by a media device isolation layer (MDIL) 300.

(In a preferred embodiment, the I/O manager 270 handles all data read from the medium. Under certain circumstances, the navigation application may access the data on the medium directly. For example, if there is a specific type of third party data stored on the medium, it may be preferable for the navigation application to access it directly. In addition, certain other types of data may benefit from being read directly from the medium or bypassing storage in cache. These types of data include sound or video data. Due to the way these types of data are used, it may be preferable for sound or video data to bypass cache storage and stream directly to the navigation application for presentation to the end-user.)

D. File Directory Mapper 298

The geographic database 40 exists in one or more physical binary files on the storage medium 22. The parcel identifiers for all data in these files, both index and map data information, are closely related to a physical offset or address in one of these files. All interface layer I/O from the I/O manager 270 is performed in terms of a physical media address and an extent (size). These addresses and extents are represented in terms of an integer number of physical subdivisions on the medium. For CD-ROM media, this physical subdivision is the 2 Kbyte sector.

The I/O manager 270 uses the services provided by the physical storage format address mapper 296 to obtain the physical media address for a parcel relative to the beginning of its file. In order for the I/O manager 270 to generate the absolute media address, the starting location of the file is determined. This information is provided by file directory mapper (FDM) 298. A file directory exists at some known location on the medium. This directory provides a physical media address for each of the files on the medium, regardless of whether they are geographic files or not. This file directory is specified for the particular medium. In a preferred embodiment, the ISO-9660 standard filesystem for CD-ROM media is used, although other alternative file systems may also be suitable. For read/write media, a DOS FAT file system may be provided, with the geographic file stored as a read-only file organized contiguously on the medium to bypass the FAT indirection.

The file directory mapper 298 isolates the I/O manager 270 from the media-specific (and therefore physical storage format specific) file directory organization. The file directory mapper 298 provides an interface which translates a file name to the physical media address of the beginning of the file. This interface may be available to the navigation application software 200, so that the locations of third party or navigation application-specific files, if any, can be obtained. This interface allows the navigation application to implement a file I/O framework based on file descriptors and byte offsets so that third party or navigation application-specific files can be accessed via the media device driver interface.

The file directory mapper 298 is able to ascertain the location of the file directory on the medium 22 based upon a predetermined information of its structure. When invoked, the file directory mapper 298 reads the directory from the known location on the medium. This is illustrated by the interface 301 between the file directory mapper 298 and the media device 22. A private buffer obtained from the memory management library 280 is used to hold a temporary copy of the directory until the offset is determined. This activity takes place at initialization time for all geographic data files to minimize repeated access of the directory. The starting location for each file is retained within the file directory mapper 298 for the duration of an operating session.

E. Physical Storage Format Address Mapper 296

As mentioned above, the physical storage format address mapper 296 translates a parcel identifier (i.e. Ea "parcel ID") into a physical media address (or addresses) relative to the beginning of the file the parcel is located in. More specifically, the physical storage format address mapper 296 translates a parcel ID to a physical sector address and sector count on the medium by using the file address mapper 298 to locate the file on the medium and translating the logical parcel ID to a starting physical sector and sector count. Multiple addresses are returned for redundantly placed index and data parcels. The address mapper 296 is a component of the I/O manager subsystem 270 that does not physically interact with the medium 22.

Figure 6:
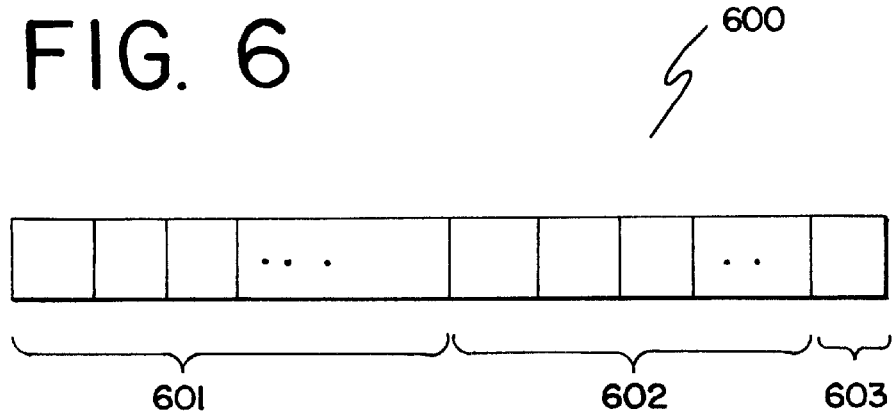
FIG. 6 is an example illustrating a parcel ID used in the physical address storage mapper of FIG. 4.

The parcel identifiers are closely related to the physical addresses of the parcel on the medium. The identifier also carriers information about parcel size and a bit (or other information) which indicates the presence of redundant copies of the parcel on the medium. An example of a parcel ID 600 is illustrated in FIG. 6. The parcel ID 600 may consist of one part 601 that is an offset from the start of the file containing the parcel, a second part 602 that indicates the size of the parcel, and a third part 603 that indicates whether there are redundant copies of the parcel on the medium. The locations of redundant copies of the parcel are determined by use of a table which is retained in global memory throughout an operating session of the navigation system. This information can be combined algorithmically within the physical storage format address mapper 296 in a physical storage format-specific way to generate the physical address using minimal CPU or memory table overhead.

The physical media address (or addresses for redundantly stored parcels) returned by the physical storage format address mapper 296 is not a byte address, but is instead at a physical subdivision of the medium. For CD-ROM media, this subdivision is the 2 Kbyte sector. For read/write media, the subdivision may be a smaller size such as 256. Similarly, the parcel size may also be expressed in these terms.

The interface to the physical storage format address mapper 296 takes a parcel identifier (parcel ID) and returns a relative physical media address (or a set of physical media addresses for redundantly stored parcels) along with the parcel size. This information corresponds to the portions 601 and 602, respectively, of the parcel ID. The relative physical media address (or addresses) is added to an absolute file starting location address that has been obtained from the file directory mapper 298 at initialization time to produce an absolute physical address (or addresses) for the parcel. If redundant copies of parcel are provided, the I/O manager 270 then chooses the closest address based on current read head location, and passes this address, the parcel extent (size), and the address of the cache buffer obtained from the memory management library 280 to the media device isolation layer 300 to initiate the physical I/O.

F. Operating System Isolation Layer (OSIL) 302

An operating system isolation layer (OSWL) 302 provides an interface between the generic operating system services to which the data access interface layer 41 is written and the particular services provided by the operating system 202 of the navigation system platform. For example, the operating system isolation layer 302 can be utilized to support various operating systems including ITRON, OS9, pSOS, VRTX, VxWorks, proprietary operating systems, and single task operating systems. The operating system isolation layer 302 is a software module that is related to a specific platform (or OS) and enables the data access interface layer 41 to operate on a particular platform.

There are several different types of operating system services. The first consists of general purpose services, such as string functions (including transformation between multi-byte and wide-character formats), math functions, common utilities such as searching and sorting, and the like. The software library that comprises the data access interface layer 41 uses some of these operating system services. For example, an ANSI C standard library (stdlib) interface is used for these functions. The memory management functions malloc( ) and free( ) also fall under the stdlib interface. These are used by the resource management subsystem 220 to allocate and resize the memory pool 278 for internal management (as mentioned above).

The other set of OS-level interfaces that the resource management subsystem 220 uses includes the protection of shared data structures in memory such as the memory management and cache control structures, and the I/O queue. Contention to these structures by multiple tasks linked to the data access interface layer 41 is managed using interprocess communication mechanisms such as semaphores and message queues. The resource management subsystem 220 preferably uses the standard POSIX.4 interfaces for these mechanisms.

If another type of interface is provided by the operating system 202 of the navigation system 10, the operating system isolation layer 302 implements the ANSI C stdlib and POSIX.4 interfaces as a translation layer to the interfaces for the native services provided by the navigation system OS. If it is not, then the service is implemented within the operating system isolation layer 302.

Note that even though the resource management subsystem 220 uses logical POSIX.4 semaphore and message queue interfaces, this does not necessarily mean that a physical semaphore or message queue is used underneath. For example, it may be faster and/or easier, compared to using a physical semaphore, to simply disable interrupts while in a critical section of code, such as reading or updating a shared cache control structure, and reenable the interrupts afterward. In a preferred embodiment, use of interrupts is limited to actions that are predictably short in order to limit any impact on other tasks. Alternatively, the I/O queue can be implemented as a "semaphore-protected" shared memory buffer instead of a message queue when the I/O manager 270. is implemented completely within the statically-linked software library of the data access interface layer 41. This alternative embodiment is discussed below. A still further alternative is to provide a single interface layer task with no multi-tasking contention to these internal resource management structures whatsoever.

The operating system isolation layer 302 allows a definition for the standard interfaces to which the data access interface software library 41 can be written. Some of the operating systems to which the data access interface layer 41 may be ported provide some or all of these interfaces. In these cases, the interface service provided by the OS can be used instead of the corresponding function provided by the operating system isolation layer 302. Some UNIX variants and some embedded-oriented operating systems provide complete ANSI C stdlib and POSIX.4 services.

G. Media Device Isolation Layer (MDIL) 300

The media device isolation layer (MDIL) 300 serves a similar function to the operating system isolation layer 302, except for the media device driver interface. In general, particularly for slow CD-ROM media, performance is improved significantly when scattered or skipped read support is provided by the device driver. This feature provides for reading some number of noncontiguous but nearby sectors into the same number of separate memory buffers provided by the caller application. This feature provides approximately sequential-access performance without having to dispatch each request separately. This feature may incur some additional rotational latency and possibly require a seek backwards when used on media such as CD-ROM, because data are physically stored in a spiral on such media. Additionally, this feature may require having to allocate a larger contiguous memory buffer to hold the desired sectors as well as any unwanted gaps.

The media device isolation layer 300 supports a scattered read device capability without requiring the actual device to support scattered reading. The I/O manager component 270 of the resource management 220 writes to a single device interface which takes an array representing a sequence of physical media addresses, extents, and memory buffer pointers. The size of this sequence is configurable. If the media device provided by the navigation system accepts this kind of scattered read interface, then the media device isolation layer 300 may not be needed. However, the device interface provided by the navigation system 10 may not provide for this feature even if scattered read support is provided. For example, a linked-list containing this information, rather than an array and size may be required. Alternatively, the data structure may be ordered differently. Accordingly, in a present embodiment, this type of translation can be handled within the media device isolation layer 300.

There are also media device drivers that do not support scattered read. This may be the case for fast drives or for read/write media. Alternatively, relatively slow device performance may be balanced with more memory for cache. In these cases, the media device isolation layer 300 dispatches each of the I/O transactions into the input array one-by-one.

Accordingly, the media device isolation layer 300, like the operating system isolation layer 302, is tailored to a specific type of media and may be specifically prepared for the process of porting the data access interface layer 41 to a particular platform. In a preferred embodiment, the media device isolation layer 300 and the operating system isolation layer 302 are the only two components that are platform dependent. Further in the preferred embodiment, the remaining library functions that comprise the data access interface 41 have identical source code for all platforms.

VII. Operation

Memory Pool Initialization and Allocation

In a preferred embodiment, the amount of memory available to the interface layer is, in part, a function of the particular hardware platform of the navigation system. Further, in a preferred embodiment, the amount of memory that is made available to the interface layer may be controlled, to a limited extent, by the navigation application. Referring to FIGS. 3 and 5, in one embodiment, the navigation application 200 may use an API (application programming interface) call to the memory manager 280 at system initialization. At this point, the memory manager 280 can allocate a certain amount of memory for use by the interface layer. One way by which the memory manager can allocate memory for use by the interface layer is to use a function call, such as malloc( ), to the operating system of the navigation application to obtain an allocation of memory.

The memory allocated by the memory manager 280 at initialization forms the interface layer memory pool 278. The memory manager 280 subdivides the memory in this memory pool 278 into multiple memory blocks. In a preferred embodiment, each block is contiguous area of memory of a predetermined, fixed size. The predetermined memory block size may be 1 Kbyte or 2 Kbyte or any other size consistent with the hardware and software of the navigation system. In one embodiment, the memory manager 280 first obtains and allocates a minimum amount of memory required for the interface layer and then obtains additional blocks of memory, by again making a function call (e.g. malloc( )) to the operating system, to obtain additional memory until it has allocated all the memory that the navigation application has configured for the interface layer. By allocating a single area of memory for minimum usage at initialization time and then allocating additional memory later, memory fragmentation can be reduced as later dellocation and reallocation results in resizing the memory usage of the interface layer, as explained below.

Deallocation and Reallocation

In a present embodiment, the interface layer advantageously provides for dynamic adjustment of the amount of memory used by the interface layer. This allows a portion of the memory in the navigation system to be used alternately by either the interface layer or the navigation application programs depending upon which of these has the greater need for the memory. In a preferred embodiment, one or more of the additional blocks of memory over the minimum amount allocated by the interface layer may be subsequently returned to the navigation application when the navigation application requires additional memory. According to this embodiment, during operation, the navigation application program 200 may request that an amount of memory be returned from the interface layer. The navigation application may require this additional memory for a memory intensive task, such as the display of a large number of items. Upon receiving the request, the memory manager 280 checks whether there is additional memory allocated to the interface layer in the memory pool 278 over the required minimum. If so, the memory manager 280 identifies an amount equal to one or more blocks, rounded up to the next higher whole block over the amount requested by the navigation system. (In a preferred embodiment, when allocating or deallocating memory from the navigation system, the memory manager 280 handles whole blocks.) By returning an amount rounded up to the next higher whole block over that amount that was requested by the navigation application, the interface layer assures that the navigation application receives at least the amount of memory it needs. The memory manager returns the memory to the navigation application by using a function call to the navigation system operating system, such as free( ).

Similarly, when the navigation application program no longer requires the additional memory, it can return the memory to the interface layer. Returning memory from the navigation application to the interface layer may follow a process similar to the initial memory allocation procedure, described above. In this manner, the interface layer can be assured of a minimum amount of memory for its own use, as well an additional amount of memory that it can routinely use thereby providing a relatively high overall level of performance. Furthermore, when the navigation application has an intensive task, it can temporarily use some or all of the interface layer's memory allocation over the minimum amount. This feature of the interface layer provides for an advantageous use of the resources of the navigation system by allowing for dynamic adjustment of the memory usage.

Memory Pool Usage

The memory manager 280 provides memory from the memory pool 278 for two different kinds of tasks. First, memory in the pool is used for a private workspace for the use of the interface layer subsystems. Second, memory in the pool is used for cache, i.e. to hold data read from the medium. When a parcel of data is read from the medium, it is stored in a cache buffer. The memory manager 280 keeps track of the number of available memory blocks in the memory pool and the number of blocks which may be allocated for private workspace. In some embodiments, newly allocated or freed blocks are preferably used for cache rather than for private workspace.

The memory manager 280 allocates memory from the memory pool 278 for both cache and for private workspace in response to requests from tasks for buffers. A requested buffer may be smaller, larger, or the same size as one of the memory blocks in the memory pool. When attempting to satisfy a request for a memory buffer larger in size than the fixed memory block size, the memory manager attempts to locate a set of contiguous memory blocks that satisfy the buffer size requested, and allocate these multiple contiguous blocks to service the request. Requests for memory may also be made for amounts less than the size of a whole block. The memory manager subdivides a memory block to satisfy smaller requests. Requests for smaller amounts of memory are more typically made for private workspace rather than for cache.

Each allocated buffer, whether for cache or private workspace, is assigned a buffer ID. This buffer ID is a constant handle associated with the buffer over the lifetime of the buffer. Memory pointers to the buffer may change due to memory compaction. In a preferred embodiment, for buffers used for cache, the parcel ID is used as the buffer ID. For buffers used for internal workspace, a unique buffer identifier is generated.

Task Buffer Counts and Task Buffer Status

The resource management system keeps track of each task's cache buffer count. A task's buffer count corresponds to how many buffers are "owned" by a task. Buffers are owned by a task whenever a task requests or reads data in a buffer or whenever a buffer is shared with another task that had ownership and the other task subsequently releases its ownership. If the buffer is used for cache, the data in the buffer include a parcel read from the medium and the ownership of the buffer is determined by the task that requested the parcel. When more than one task requests data in a buffer, the memory manager assigns ownership of the buffer to the last task that requested the data in the buffer or the last task that read data from the buffer. A task loses ownership of a buffer when another task takes ownership of the buffer or when the task ignores the data (i.e. the parcel) in the buffer. A task also loses ownership of a buffer when the buffer is swapped out. A task's cache buffer count changed each time the task takes control of or loses a buffer.

Tasks may have assigned minimum and maximum cache buffer limits. These limits relate to how many buffers can be "owned" by a task. These limits may be enforced only when there is contention for available memory resources. Otherwise, each task is permitted to use as much memory as is available. When memory resources are in contention, tasks that exceed their maximum buffer limits will lose buffers. Tasks will not lose buffers if they are only at their minimum buffer limits.

Each buffer has a status. The memory manager 280 keeps track of the status of each of the buffers. The status of a buffer derives from the status of the tasks using the buffer. More than one task may be using a single buffer. The memory manager 280 maintains a status of each task that accesses the parcel.

A buffer's status may be "locked", "active", or "ignore." When the contents of the buffer are currently in use by a task, the task status and the buffer status are set to "locked." If any one task using a parcel in a buffer is locked, then the buffer is locked as well. When a buffer is locked, it is not available for swapping out of cache. Also, in a preferred embodiment, a locked buffer may not be moved, such as during memory compaction.

A buffer in "active" status indicates that one or more tasks may still be interested in the contents of the buffer, but that the buffer can be swapped out if the memory in it is needed. Information about the task, its resource priority, and so on, remain associated with the buffer so that these factors can be evaluated by the memory manager when the manager is seeking memory to swap out. Unless the buffer is needed for other tasks, the data remains in the cache buffer and the buffer is available, if needed, for other tasks that may need to access the data in the buffer.

A buffer in "ignore" status indicates that no tasks are currently using the memory in the buffer. Therefore, this buffer may be used for other tasks or swapped out. Ignored buffers may also be moved and/or compacted.

Compaction

The resource manager also provides compaction and so-called "garbage collection" of the interface layer memory pool 278. As memory blocks are allocated and deallocated, fragmentation may occur within the memory pool. The memory manager 280 groups together adjacent unused memory blocks and memory blocks having "ignore" status for subsequent reuse for cache or private workspace. In addition the memory manager may physically move unlocked buffers in order to decrease fragmentation.

In determining when to swap out or compact memory, the memory manager takes into account resource priority, task buffer counts, and buffer status. In general, a high priority application or an application that frequently accesses its cache will have a reduced likelihood of having its buffers swapped out.

When deallocating or compacting the memory, it may be preferred to select the memory in the region closest to the original boundary between the interface layer's allocated memory 278 and the application's allocated memory 283.

Processing of a Query Task

As mentioned above, the interface layer defines a set of calls that can be used by a navigation application program to access a set of geographic data entities on a physical storage medium. The set returned by the interface layer can be empty, can include a single entity, or can return a list of multiple entities. These returned entities conform to the logical data model, described above, which is a decompressed format. The interface layer accepts calls that allow the navigation application to formulate a query for data. These calls may be qualified by spatial as well as non-spatial attributes of the desired entities. The attributes used to qualify a query can be used singly or in combination, and can specify a range or a single value.

In a preferred embodiment, the geographic data on the medium are organized into one or more files. The data include spatially organized data, nonspatially organized data, and index data. The storage medium may include other types of data as well. The spatially organized data include data such as segments of roads and nodes. In a preferred embodiment, these data are organized into parcels which contain the data entities encompassed within physical geographical localities within the geographic region. Non-spatially organized data may include data, such as names of navigable features. These data may be organized in a manner that facilitates their use, such as alphabetically or by municipality. Indexing data include indexes that relate the various spatial and non-spatial data to each other. These indexes may include kd-tree indexes, B-tree indexes, and so on. In a preferred embodiment, all these types of data are included in parcels, each identified by a unique parcel ID. In a preferred embodiment, the parcel size is related to a physical sector size on the physical medium. For example, for CD-ROM media, the sector size is 2 Kbytes and the parcel size is a multiple of the sector size, e.g. 16 Kbytes. In a preferred embodiment, the interface layer accesses data from the medium in whole parcels and loads whole parcels into memory in a single physical read in order to resolve a query. Multiple parcels may be read into memory in order to resolve a query transaction.

When the query logic subsystem 210 receives a call for geographic data from the navigation application program 200, the request may be in the form of a "geo-coded" request. This means that the navigation application 200 wants data relating to certain geographic conditions or boundaries. The query logic subsystem 210 resolves the request into parcel ID's by mapping the request to a set of parcels so that the data can be retrieved from the medium. This is done using the index management subsystem 242. Accordingly, it may necessary to first access the index data in order to identify the parcel ID's of the geographic data needed to respond to the query. Commonly-used index data may be read into memory at initialization time. If the desired index data are not already in memory, they are read from the medium.

Once the parcel ID of the desired data is identified, the request for the parcel is directed to the memory manager 280. The memory manager examines the cache portion of the memory pool to determine whether the requested parcel has already been stored in cache memory in response to a request from a previous task. If the requested parcel is already in cache, the memory manager 280 returns a pointer to the cache buffer to the requesting task and locks the buffer (as explained above). If the requested parcel is not already in cache, the memory manager 280 sends the request to the I/O manager 270. In the I/O manager, the requested parcel is compared to a list of parcels that have already been requested but not yet been sent to the media driver. If the parcel is on the list of requested parcels, the task's (client's) identification is added to the information associated with the parcel. If the parcel is not in the list, the parcel is added to the list along with an identification of the task (client) requesting the parcel and information indicating the parcel's sector location and length. When a task requires a plurality of parcels, the listing of parcels are sent as a group to the I/O manager for retrieval in order to satisfy the request at the same time.

For each parcel requested, the I/O manager 270 calls the physical address mapper 296. The physical address mapper 296 translates the parcel ID and returns the parcel size and physical starting sector (or sectors if the parcel is stored redundantly). Using this information, the I/O manager 270 sorts the I/O requests in priority and sector proximity order taking into account the current read head position. For parcels stored redundantly, the I/O manager 270 selects the sector that results in the minimum search time.

The I/O manager 270 calls the memory manager 280 to allocate cache. The memory manager 280 scans a list of free memory in the memory pool 278 to find available memory and adds the available memory to cache. The memory manager 280 locks a buffer, as described above, to indicate that the memory associated with the buffer is reserved for I/O. Data are also stored that identifies the client task that requested the I/O.

If the memory manager 280 finds no available memory, it attempts to swap out memory. As mentioned above, locked buffers are not swapped out. If there are any buffers whose status is "ignore", these are swapped out first. If memory is still needed in order to allocate cache for a new I/O, the list of tasks is examined to see if any tasks have exceeded their maximum buffer limit. If so, the memory manager 280 searches for any unlocked buffers used by the task and these are selected for swapping out. If memory is still needed for allocating to new data, buffers whose status is "active" are examined and these are swapped out for use for the new data.

If the request for a memory buffer for the new I/O cannot be satisfied with the available memory in the memory pool 278, the memory manager 280 may perform compaction of the memory pool. As described above, only unlocked buffers are available for compaction.

It may occur that even after compaction no memory is available in the size requested by the I/O manager for the new I/O. If this occurs, the memory manager 280 returns information to the I/O manager 270 indicating the largest cache space that is available. The I/O manager 270 then scans the I/O request list to determine whether any I/O request waiting to be serviced can be satisfied by the available cache. If there is an I/O request waiting to be serviced that can be satisfied with the available cache size in memory, this I/O request is serviced. The I/O manager 270 sends a message to the memory manager 280 to lock the cache memory that is available in the requested size. The I/O manager 270 then sends the I/O request to the media driver for retrieval.

If no I/O request in the I/O request list matches the available memory, the I/O manager 270 temporarily stops generating new requests for cache to the memory manager 280. Eventually, as tasks are completed, the memory manager 280 unlocks or frees memory and as memory becomes available, the pending I/O requests are serviced.

When the memory manager 280 indicates to the I/O manager 270 that cache is available to service an I/O request, the buffer is reserved. The I/O manager services the I/O request list by building scattered read requests. A number of reads may be chained together. Once this information is sent to the media driver, the I/O requests are removed from the I/O request list.

The memory manager 280 sets the status of the cache buffer to "active." The memory manager returns a pointer to the buffer back to the task that requested the data, e.g. a call from the query logic subsystem. Once the pointer to the buffer is returned to the task that requested it, the buffer's status is set to "locked." The data in the cache buffer are used as appropriate. The pointer to the buffer is not changed until the task unlocks the buffer, e.g. by indicating that it has finished with the data in the buffer. When the data (in the logical data model format) are returned to the navigation application and therefore the data in the cache buffer are no longer needed by the task, the task in the query logic subsystem 210 also returns a message to the memory manager to reset the cache buffer from "locked" to "active" or "ignore" indicating that the data are not presently needed. When it is no longer "locked", the buffer may be compacted, moved or released.

In general data are maintained in cache for as long as possible consistent with other requirements. This provides the advantage that once data are in memory they are stored in a cache because of the possibility that the data may be needed for a subsequent task. Therefore, the data may persist in cache over a period of time that includes several calls from the navigation application. In order to provide for memory compaction and defragmentation, data which are not locked may be moved by the memory manager 280 from one memory location to another. In order to find the data which may be in cache, a task requests the data by the buffer ID, which in a preferred embodiment is the same as the parcel ID for cache data. Therefore, when a task requests a parcel, it obtains a pointer to an address of a buffer. The "pointed-to" buffer has a buffer ID which is the same as the requested parcel ID. In this manner, the memory manager 280, by keeping track of buffer ID's and their addresses, returns a pointer to the task indicating where the buffer is located. If the memory manager 280 moves a buffer during compaction, it keeps track of new location of the buffer so that the appropriate pointer can be returned to any task requesting that particular buffer. Pointers maintained in memory buffer itself are by offset and not absolute address as the base block address can move.

Processing of a Request for Private Workspace Task

As mentioned above, the memory manager 280 also allocates buffers for private workspace for interface layer functions. As mentioned above, if the memory required by an interface layer function is smaller than one of the fixed sized blocks in the memory pool 278, the memory manager 280 subdivides the block into smaller sized portions. When a request for private workspace is made, the memory manager 280 first searches memory blocks that are already in use by private memory functions to determine whether there is sufficient space available in the block to meet the memory needs of the new request. Additional blocks may be allocated for private workspace, if needed.

The memory manager 280 assigns a unique buffer ID to each block used for private workspace. These buffers are locked while in use by the interface layer function.

Operation of the Physical-to-logical Data Translation Subsystem

The physical-to-logical subsystem 244 subsystem is responsible for translation of information from the optimized physical storage format found in parcels read from the medium into memory by the resource management subsystem 220. This translation occurs in two phases. The first phase is from the compressed physical storage format to the decompressed intermediate format (DIF) that can be examined to resolve queries. The second phase is from the decompressed intermediate format to the final logical data model format that is returned to the application via the query logic system 210.

Operation of Cursor Management System

The tasks that request data, as described above, may result in either small or large amounts of data being found. The cursor management subsystem 249, which is part of the query logic subsystem 210, handles these results regardless of the amount of data that results from a request. Operation of the cursor subsystem begins with a function in the query logic subsystem that expects to require use of the cursor subsystem in connection with a request for data. Several different functions in the query logic subsystem 210 can expect to retrieve data that requires use of the cursor management subsystem. First, the function in the query logic subsystem initializes memory, i.e. a buffer, for the cursor. The cursor cache is a portion of memory that holds an array of data structures. The structures are determined by the query function based on the query type. Information about the structures are passed to the cursor management subsystem. The information may include the number of records to be used in a cursor cache, record size, number of data entity ID's (DBID's) that could be stored in the cursor memory, and so on. Some of this information may be fixed in size, such as the DBID. Referring to FIG. 5A, this information is used to set up the arrays 511 and 513 for holding the decompressed data entities and the data entity ID's, respectively.

After the cursor's cache is allocated, the query is processed to obtain the data results, as described above. If multiple entities are located that satisfy the request, each of the data entities retrieved is stored in fully decompressed logical data format in the array 511 until the array is full. The data entity ID's (DBID's or database identifiers) for the records stored in the array 511 are included in the second array 513. In addition, if the number of data entities identified as matching the query exceeds the number of data entities that can be stored in decompressed form in the first array 511, the data entity ID's for these additional data entities are stored in the second array 513 after the ID's of the data entities stored in the first array. In the example of FIG. 5A, twenty data entities are stored in fully decompressed form in the first array 511 and the entity ID's of 100 data entities (including the first twenty) are stored in the second array 513. Any of these data entities in the first array 511 can be immediately returned to the navigation application program since they are fully decompressed. Both the number of entities that can be stored in the decompressed array 511 and the number of database ID's that can be stored in the array 513 are determined by the query function that calls the cursor management system.

In a preferred embodiment, the first array 511 supports both FIFO (first-in-first-out) and LIFO (last-in-first-out) during use of the cursor cache. If a record beyond the last record in the array is requested, for example record 21, that data entity is found (using the entity's DBID in the second array 513), decompressed into the logical data format, and stored in decompressed form in the first array 511 replacing the oldest record (e.g. record 1). Similarly, if record 22 is requested, it is found using the data entity ID from the second array 513, decompressed into logical data format, and stored replacing record 2 in the first array 511. This type of access is in the forward direction and would use FIFO. On the other hand, if record 1 were then requested, record 1 would be retrieved, decompressed, and stored in decompressed form in the first array 511 replacing record 20. Record 20 would be replaced since it is the oldest record in the first array 511. This type of access is in the reverse direction and would use LIFO.

Figure 5B:
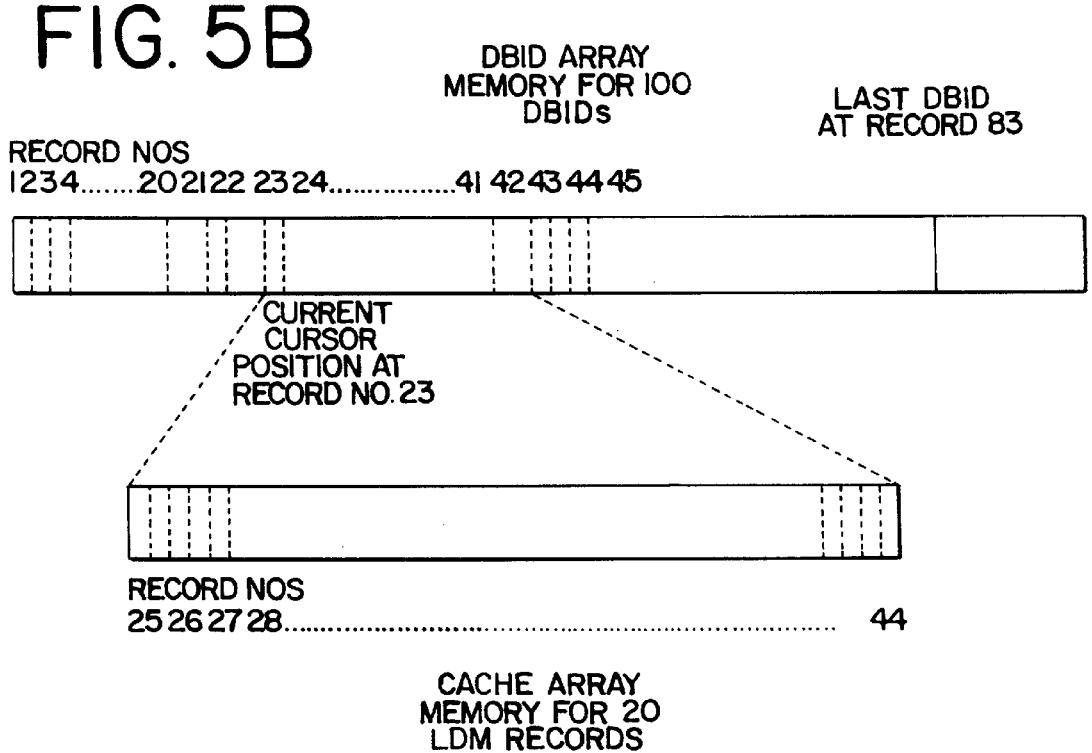

Another example is shown in FIG. 5B. In FIG. 5B, the first array 511 is shown as being occupied with records 25 through 44. If record 24 were requested, it would be decompressed and would be stored in the first array 511 replacing record 44. If record 23 were then requested, it would be decompressed and would be stored in the array 511 replacing record 44, and so on.

In FIGS. 5A and 5B, the second array 513 (i.e. the array that holds only the data entity ID's) is shown to have a size that accommodate only 100 data entity ID's. It is possible that the query will result in more than 100 entities. When there are more entity ID's than will fit into the second array 513, the cursor subsystem retains information that provides for one or more additional pages of data entity ID's.

The following example illustrates the paging function of cursor system. For purposes of this example, it is assumed that the first array 511 can hold 20 decompressed data entities and the second array 513 can hold 100 data entity ID's, but that the query results in 1000 records.

| Cursor Page | ID's range in ID array 513 | ID's range in cache array 511 | Page header |
|---|---|---|---|
| 1 | 1–100 | 1–20 | 1 |
| 2 | 80–180 | 100–120 | 80 |
| 3 | 160–260 | 180–200 | 160 |
| 4 | 240–340 | 260–280 | 240 |
| 5 | 320–420 | 340–360 | 320 |
| 6 | 400–500 | 420–440 | 400 |
| 7 | 480–580 | 500–520 | 480 |
| 8 | 560–660 | 580–600 | 560 |
| 9 | 640–740 | 660–680 | 640 |
| 10 | 720–820 | 740–760 | 720 |
| 11 | 800–900 | 820–840 | 800 |
| 12 | 880–980 | 900–920 | 880 |
| 13 | 960–100 | 980–1000 | 960 |

In the example, initially the first array 511 includes records 80–100 in decompressed form and the second array 513 is includes the first 100 data entity ID's. At this point, neither the first nor the second array includes any data entities or ID's beyond record 100. If the application want to access the 101th record, the query has to be resolved again. All the data entity ID's in the second array 513 are cleared and replaced with entity ID's for records 80–180. The record 101 is decompressed and stored in the first array 511 replacing record 80. The table shows the ranges for each page when there are 1000 records and the arrays 511 and 513 hold 20 records and 100 entity ID's, respectively.

The arrays described above can be used with various types of data including types of data that do not have their own entity ID's. These types of data may be attributes associated with, or describe, entities in the database. Examples of these types of data include blocks, landmarks, and text. For these types of data, a virtual ID is assigned by the cursor management system. The virtual ID would be similar to a regular data entity ID except that instead of representing a type of entity, it would represent an offset, or other type of information.

Certain types of data may not be handled by the cursor management system, but instead would bypass the cursor management system and be sent directly to the navigation application. These types of data may include shape points. The navigation application would provide appropriate memory buffers to accept the shape point information.

VIII. Porting and Configuration

Figure 7:
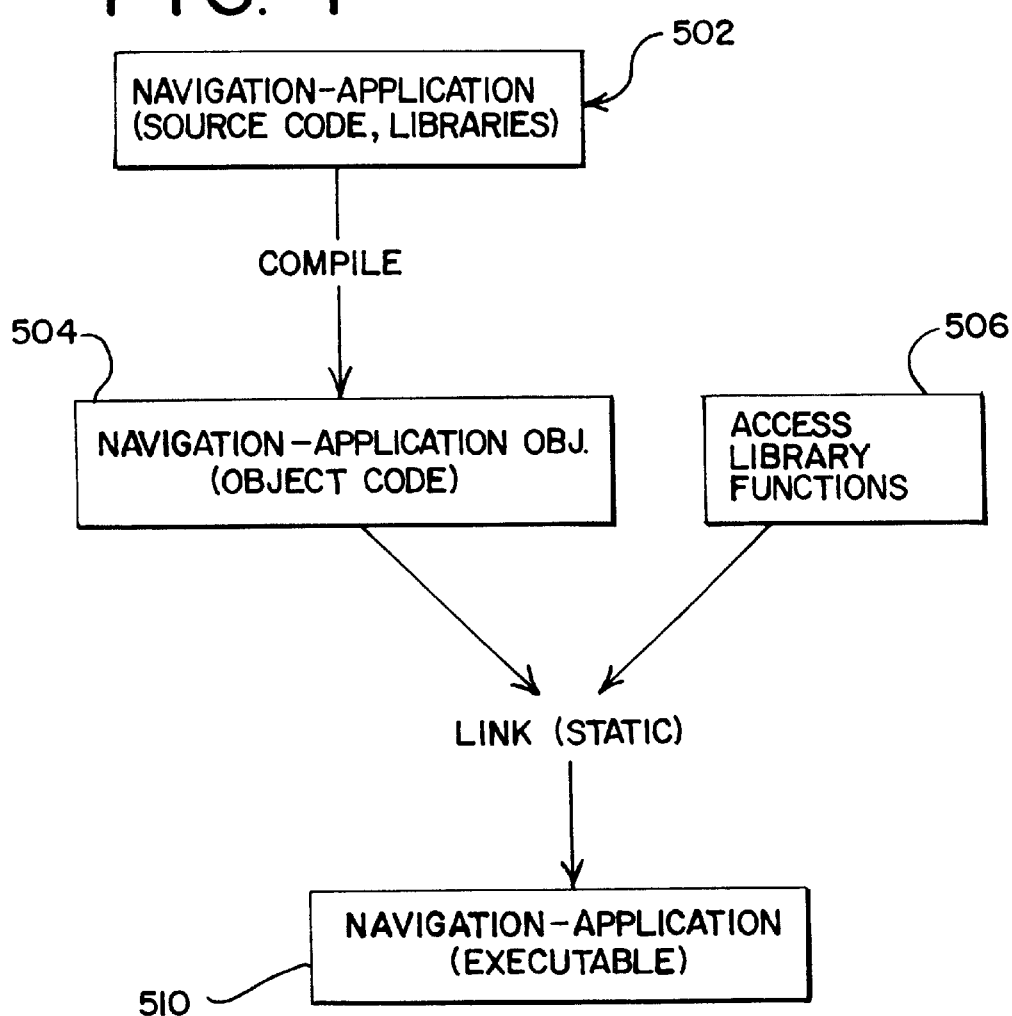
FIG. 7 is a flow diagram illustrating the process for linking the navigation application component with the data interface layer.

FIG. 7 is a flow chart showing a process for compiling the source code for the data access interface layer and the navigation application software programs to form an executable module. In a preferred embodiment, the source code for the navigation application functions is written and saved as libraries of source code functions 502. These libraries are compiled to form an object code module 504 for the navigation application functions. This object code is then statically linked with the source code 506 for the interface library functions to form an executable module 510 which is specific to a particular navigation system platform. The executable module 510 may be installed on the navigation system platform in various ways. For example, the executable module may be copied from an additional drive slot or may be pre-installed into some form of non-volatile memory in the navigation system.

In a preferred embodiment, the data access interface layer software includes a number of tunable parameters whose values can be adjusted to optimize performance on a particular platform. These parameters can be adjusted as part of the porting process. The porting process includes optimizing these tunable parameters for the combination of navigation application software, OS, media device driver, and hardware.

The data access interface software library subsystems have the potential to be configured either at compile time, run time, or both. Some of the configuration information takes the form of a set of C code variables which may reside in a separate source code module. The values of these variables can affect the run time behavior of a particular subsystem. These variables can be initially set to default values and adjusted in source code form. The resulting optimized configuration information is then linked with the implementation of the particular navigation subsystem. Additional configuration information takes the form of conditional compilation statements and preprocessor defined constants, which are used to optimize subsystem behavior at compile time.

IX. Updating and Compatibility Across Version Changes

As mentioned above, one of the advantages provided by the data access interface layer is that it enables updating of the geographic database. Updating can occur in several contexts. For example, in the context of new navigation systems, it may be that a particular navigation system platform is offered for sale over a number of years. It is desired that when the navigation system is sold, the geographic database provided with the system is up-to-date. This objective can be accomplished using the data access interface layer, described above, by installing a storage medium upon which is stored an up-to-date geographic database into the navigation system at the time of delivery to the end-user customer. Furthermore, from the standpoint of the end-user, it is desirable to allow the end-user to obtain updated geographic data after the navigation system is installed over the lifetime of the navigation system. To meet this latter objective, subscriptions may be offered that provide end-users with updates on a regular basis. The data access interface layer permits the end-user's system to use updated geographic data.

Update transactions can be handled using any of several alternatives. One alternative is to update the geographic data at a central location, compile an entirely new geographic database, and prepare new copies of the storage medium with the new database. These new media would then be distributed to end-user subscribers who then replace their old storage media with the new media. This alternative can be used when the media is not rewritable, such as a CD-ROM. If the medium is rewritable, such as a PCMCIA card, the new geographic database can be applied directly to the old medium. Another alternative is to provide updated geographic data in the form of a separate file or database that contains a listing of changes relative to the version of the geographic database in the end-user's system. This separate file can be located on the same medium as the original geographic database (in the case of re-rewritable media), or on a separate medium (in the case that the original medium is read-only). Once the separate file can be accessed in the navigation system, it is used together with the original geographic database. The updated data from the separate file are transparently applied to the appropriate data entities as they are accessed by the navigation application through the data access interface layer (e.g., a "look aside"). This function 811 may be implemented in the physical-to-logical subsystem 244 of the interface layer. The updated geographic data can be distributed by various different means, including wireless broadcast or updating stations, as disclosed in cop ending application Ser. No. 08/592,737, entitled "SYSTEM AND METHOD FOR DISTRIBUTING INFORMATION FOR STORAGE MEDIA", filed Jan. 26, 1996, the entire disclosure of which is incorporated by reference herein.

The data access interface layer not only allows the navigation system to use updated geographic data, but also allows the navigation system to use geographic data provided in new formats. The data access interface layer 41 and the logical data model can be extended to take advantage of new data attributes or values that are added to the geographic database in the future as requirements arise. New attributes or values can appear in the map coverage data or in the physical storage format. As new map data features emerge, these can be included on the geographic map data media and can be used by any navigation systems that support them. Thus, the physical storage format may evolve to include additional types of information beyond what it currently provided. However, because the data access interface layer isolates the navigation application from the physical geographic database, the navigation application manufacturer need not upgrade its navigation application software every time the geographic database is updated. In addition, the end-user who has an installed navigation system can acquire updated geographic databases over the years and be assured that they will work in his navigation system even if the updated geographic databases include new types of information. Because the geographic database publisher-distributor does not have to produce multiple different geographic database formats for a variety of different hardware platforms, the geographic databases can be made available to end-users at potentially lower costs, with fewer distribution complexities, and possibly more frequently, as well as with other advantages.

If new attributes are added to the physical storage format, or if other changes to the physical storage format are implemented, the version level of the physical storage format may evolve beyond the version level of the navigation application program. Thus, when an updated geographic database is installed in a navigation system, it is possible for the logical data model format and physical storage format version levels to differ. As database version levels increase, as reflected in the physical storage format, forward compatibility is provided by means of the data access interface layer to maintain the viability of the end user's system. Forward compatibility can be supported in this manner for a long time, possibly up to ten years. Some data version changes may consist of adding new attributes or values, and therefore one way that the data access interface layer can accommodate new attribute or values is to filter out the new data, reordering and transforming them to fit the old template.

Compatibility across different version levels is provided by metatranslation. Metatranslation uses a set of tables for each version level. Referring to FIG. 3, these metadata tables 259 reside on the storage medium 22 (e.g. on the CD-ROM or PCMCIA card). The metadata tables include information that describes the location, size, type, and content of the various data attributes and values appearing in a given database entity. In the physical-to-logical data translation subsystem 244, conversion between the compressed physical storage format on the medium to the decompressed intermediate format usable by the query logic subsystem 210 utilizes a metadata table for each physical storage format data representation. The physical storage format metadata is used to extract a data element relative to the beginning of a particular physical storage format entity. The data element then undergoes a translation or conversion process which is controlled by the information in the metadata tables.

Metadata tables may be located on the storage medium for each data version from the earliest version to a current version. The version level of the software library that forms the data access interface layer 41 is used to identify the appropriate set of metadata to use.

The metadata tables are read from the storage medium through the operating system kernel and physical devices subsystem (i.e., the operation system isolation layer 302 and the media device isolation layer 300). From these subsystems, the resource management subsystem 220 provides the metadata to the physical-to-logical data translation subsystem 244 where the metatranslation is performed. In a preferred embodiment, the metadata are physically read from the medium only at initialization time. The metadata tables are read into memory that is allocated from the heap on a semipermanent basis, so that the metatranslation process can access the tables efficiently for each data access.

Metadata tables can also be used to provide backward compatibility. Some navigation system developers may design their systems so that the navigation application software can be upgraded or updated over time after the navigation system is sold. This upgradability may be offered to take advantage of new features offered in the geographic database. In order to allow a newer navigation application software program to use an older version of a geographic database, a metadata table, for example table 813, can be provided in the new version of the navigation application software. Like the metadata table provided on the storage medium, the information in the metadata table provided with the newer version of navigation application software is used to compare the version levels of the navigation software and the physical storage format. The information in these metadata tables is provided to the physical-to-logical subsystem 244 at initialization time to perform any necessary attribute conversions. As mentioned above, if the version levels of the navigation application program and the physical storage format are the same, the metadata conversion step is unnecessary and the physical-to-logical subsystem can skip this conversion step.

X. Further Alternative Embodiments

The above embodiments disclose an interface layer system that can be used in a navigation system. In one present embodiment, the navigation system is an in-vehicle navigation system that is installed and located in an end-user's vehicle. The type of vehicle may include automobiles, trucks, buses, and so on. The end-users of such a system may include individuals who own or lease their own vehicles, as well as fleet owners, businesses, car rental agencies, trucking companies, transportation companies, and so on. In alternative embodiments, the navigation system may be other-than-in-vehicle. For example, the navigation system may be a hand-held unit that a person can carry on his/her person. Also, the navigation system may be installed in a non-mobile location, such as at a service station, car rental agency, a personal computer and so on. Still further, the navigation system may be installed and used by traffic control agencies, police, delivery services, and so on.

In a preferred embodiment, the interface layer is statically-linked to the navigation application programs after the application programs are compiled in order to form an executable module. In an alternative embodiment, the interface layer may be dynamically linked to the navigation applications.

Figure 8:
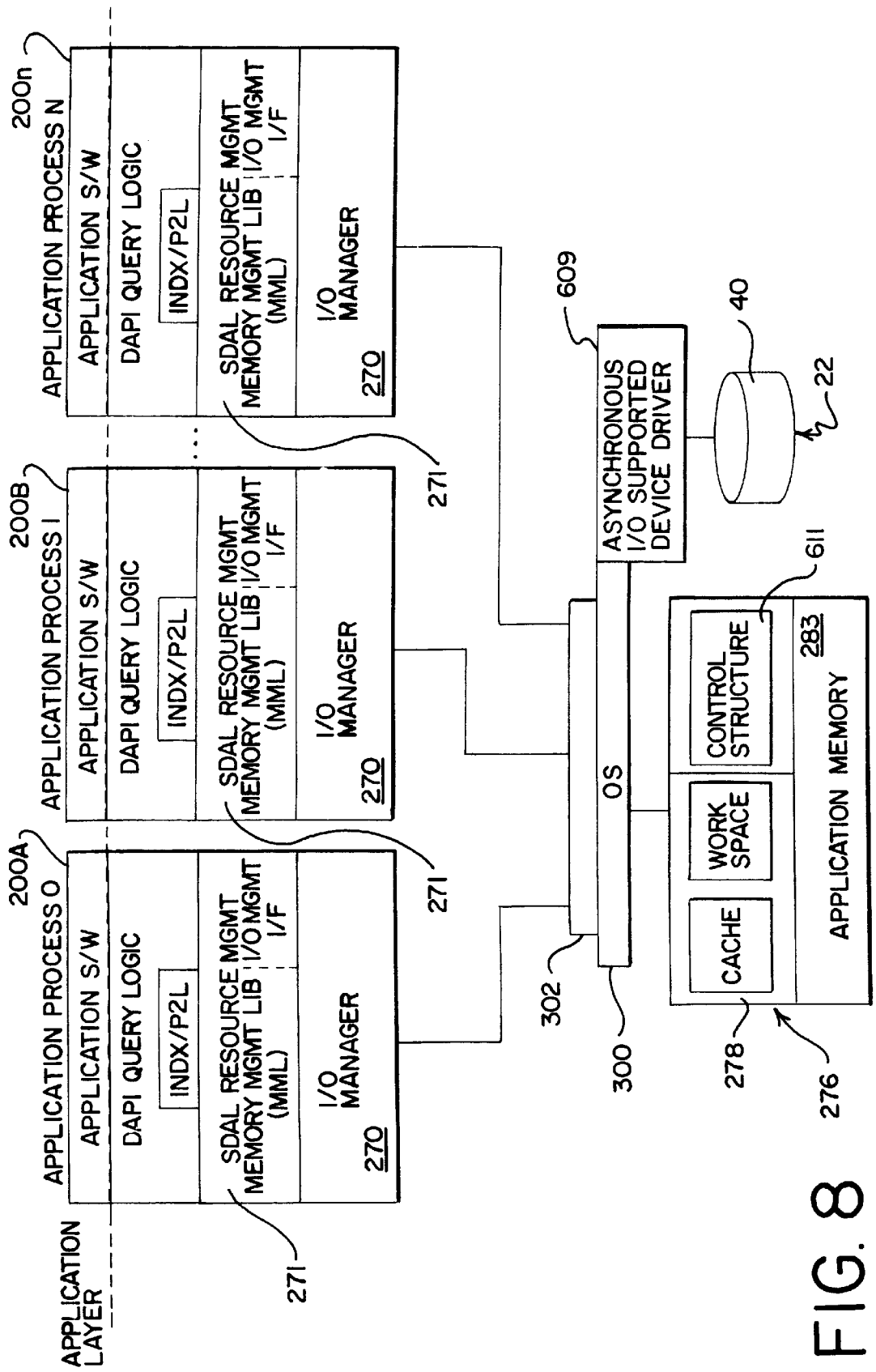
FIG. 8 is a block diagram illustrating another embodiment of the resource manager software architecture of FIG. 3.

An alternative embodiment is shown in FIG. 8. In this alternative embodiment, asynchronous I/O is supported by the navigation system's media device driver 609. Implementation of asynchronous I/O requires that when a disk I/O is submitted to the kernel, the process invoking the request can continue to run and is notified when the I/O request is complete. In such an alternative, a shared code version of the I/O manager submits the I/O request and return control to the navigation application. When the I/O is completed, an asynchronous event would be posted to a client message queue for servicing.

In this alternative, the I/O manager 270 may exist completely within the statically-linked portion 271 of resource management subsystem 220, i.e the I/O manager 270 would be linked with each of the navigation application programs 200. In this alternative, the I/O queue is implemented as a control structure 611 in the memory pool. In this case, interprocess communication techniques, such as semaphore protection, are used to manage contention to the I/O queue from multiple processes. The rest of the features of the interface layers systems would be similar to those described above.

XI. Conclusion

The data access interface layer described above provides a uniform interface that is incorporated in a navigation system. The data access interface layer can be utilized on different navigation system platforms developed by different manufacturers. The data access interface layer functions regardless of the hardware platform or end-user functionality of the navigation system. The data access interface layer provides a common transparent mechanism for accessing geographic data stored on a physical medium. The data access interface layer isolates the navigation application programs from the details of the organization of the geographical data and the physical requirements of the specific storage medium implementation.

Because the data access interface layer presents a uniform, consistent view of the geographic database, navigation system developers can continue to develop and enhance their navigation systems to provide new and better functionality without concern about interfacing with the physical medium and the storage format of the geographic database. Navigation system developers can therefore focus on providing new types of navigation application programs and new hardware platforms and operating systems having access to a consistent geographic data interface. From the end-user's point of view, the data access interface layer provides that updated geographic data can be used in the end-user's navigation system, thereby reducing the risk that the navigation system might become obsolete due to the geographic data version becoming out of date.

It is intended that the foregoing detailed description be regarded as illustrative rather than limiting and that it is understood that the following claims including all equivalents are intended to define the scope of the invention.

We claim:

1. A computer program product for use in a navigation system wherein the navigation system includes a navigation application program that provides navigating features to a user of the navigation system and a geographic database stored on a physical storage medium in a computer-readable physical storage format, said computer program product comprising an interface layer comprising:

programming that accepts and processes requests for geographic data from the navigation application program;

programming that translates geographic data from said physical storage format and provides said geographic data to said navigation application program; and programming that provides a cursor to said navigation application program in response to a request for geographic data from said navigation application program, said cursor including multiple records, and wherein said programming that provides a cursor is responsive to said programming that translates and is adapted to receive said geographic data therefrom.

2. The invention of claim 1 wherein said programming that provides a cursor further comprises:

programming that provides a first portion of said cursor in a logical data model format; and programming that provides an entity identifier to a first remainder of said cursor wherein said first remainder is maintained in a compressed format.

3. The invention of claim 2 wherein said programming that provides a cursor further comprises:

a fetch next function that provides a second portion of said cursor in said logical data model format, said second portion comprised of said first remainder.

4. A computer program product for use in a navigation system wherein the navigation system includes a navigation application program for providing navigating features to a user of the navigation system and a geographic database stored on a physical storage medium in a compressed, computer-readable physical storage format, said computer program product comprising an interface layer located logically between said navigation application program and said geographic database, said interface layer comprising:

programming that accepts and processes requests for geographic data from the navigation application program; and programming that decompresses geographic data from said physical storage format and provides said geographic data to said navigation application program in a decompressed format.

5. The invention of claim 1 wherein said interface layer further comprises:

programming that manages indexes responsive to said programming that accepts and processes requests and to index information, said programming that manages indexes providing an identifier for obtaining geographic data on said physical storage medium for responding to said requests by said navigation application program.

6. The invention of claim 5 wherein at least a portion of said index information is located on said physical storage medium, and wherein said programming that manages indexes provides parcel identifiers for obtaining pointers to parcels on said physical storage medium containing geographic data for responding to said requests by said navigation application program.

7. The invention of claim 5 wherein said programming that manages indexes further comprises:

an interface for translating a specific entity identifier passed from said navigation application program to a parcel identifier for a parcel on said physical storage medium.

8. The invention of claim 5 wherein said programming that manages indexes further comprises:

an interface for taking an index specifier and query parameters from said programming that accepts and processes requests and returning a set of parcel identifiers.

9. The invention of claim 5 further comprising:

programming that reads said index information from said physical storage medium into a buffer, wherein said programming that manages indexes is coupled to said buffer to obtain said index information therefrom.

10. The invention of claim 4 wherein the physical storage format of the geographic database organizes said geographic data into a plurality of parcels, and wherein said interface layer further comprises:

programming for associating said requests with parcels in said physical storage format and causing said parcels to be read from said physical storage medium.

11. The invention of claim 4 wherein the physical storage medium comprises a CD-ROM disk.

12. The invention of claim 1 wherein said programming that decompresses geographic data further comprises:

a first interface for translation of geographic database entities from the physical storage format into an intermediate format; and a second interface for translation of geographic database entities from said intermediate format to the decompressed format in which said geographic data are provided to said programming that accepts and processes requests.

13. The invention of claim 12 wherein said programming that decompresses further comprises:

programming responsive to a metadata table on said physical storage medium and said first interface and adapted to translate said geographic data in said intermediate format at a first version level to an intermediate format at a second version level and provide said geographic data in said intermediate format at a second version level to said second interface.

14. The invention of claim 4 wherein said interface layer further comprises:

programming that manages resources comprising:

programming that allocates and frees memory of said navigation system for use as a memory pool by said interface layer; and programming that accesses a cache memory buffer in said memory pool that stores a parcel read from said physical storage medium, said parcel identified by means of a parcel identifier.

15. The invention of claim 14 wherein said programming that manages resources further comprises:

programming that initiates an I/O transaction from the physical storage medium to read said parcel therefrom if said programming that accesses a cache memory buffer finds that said parcel is not stored in said cache memory buffer.

16. The invention of claim 14 wherein said programming that manages resources further comprises:

programming that locks a cache memory when a parcel is stored therein and a buffer address is returned to said programming that decompresses geographic data.

17. The invention of claim 14 wherein said programming that manages resources further comprises:

programming that resizes said memory pool in response to a call from said navigation application program.

18. The method of claim 4 wherein said programming that decompresses further comprises:

programming that transforms said geographic data from said physical storage format into an intermediate decompressed format; and programming that transforms said geographic data from said intermediate decompressed format to said decompressed format usable by said navigation application program.

19. The invention of claim 4 wherein said geographic data is provided to said navigation application program in a generic ASCII format.

20. The invention of claim 4 wherein said geographic data is provided to said navigation application program as data entity records of fixed lengths without cross-reference information.

21. A computer program product for use in a navigation system wherein the navigation system includes a navigation application program that provides navigating features to a user of the navigation system and a geographic database stored on a physical storage medium in a computer-readable physical storage format, said computer program product comprising an interface layer comprising:

programming that accepts and processes requests for geographic data from the navigation application program; and programming that translates geographic data from said physical storage format and provides said geographic data to said navigation application program in a logical data model format, wherein said logical data model format includes uncompressed entity records of fixed lengths, and wherein said programming that translates further comprises:

programming that unpacks said geographic data from said physical storage format into a decompressed intermediate format; and programming that transforms said geographic data from said decompressed intermediate format into data entities in said logical data format for returning to said navigation application program.

22. A computer program product for use in a navigation system wherein the navigation system includes a navigation application program that provides navigating features to a user of the navigation system and a geographic database stored on a physical storage medium in a computer-readable physical storage format, said computer program product comprising an interface layer comprising:

programming that accepts and processes requests for geographic data from the navigation application program;

programming that translates geographic data from said physical storage format and provides said geographic data to said navigation application program in a logical data model format, programming that allocates and frees memory of said navigation system for use as a memory pool by said interface layer;

programming that accesses a cache memory buffer in said memory pool that stores a parcel read from said physical storage medium, wherein said parcel can be identified by means of a parcel identifier programming that initiates an I/O transaction from the physical storage medium to read said parcel therefrom if said cache memory buffer accessing means finds that said parcel is not stored in said cache memory buffer;

wherein said programming that initiates an I/O transaction further comprises:
stores parcel identifiers in a queue and
reorders parcel identifiers while in said queue.

23. The invention of claim 22 wherein said programming that initiates an I/O transaction translates said parcel identifiers to physical media addresses while in said queue.

24. The invention of claim 22 wherein said navigation system further includes a media device driver and wherein said programming that initiates an I/O transaction obtains from said media device driver a physical read head position and uses said physical read head position when reordering said parcel identifiers.

25. A method of using a computer-based navigation system wherein said navigation system includes navigation application program functions wherein said navigation application program functions are adapted to use a geographic database stored on a computer-readable medium in a physical storage format, the method comprising:

accepting a request from one of said navigation application program functions for geographic data;

using an index to identify the geographic data in said physical storage format for responding to said request;

transforming geographic data stored in said physical storage format into a format usable by said navigation application program functions; and after a plurality of data entities are identified in response to said request from said one of said navigation application program functions, providing a first partial result set of said plurality of data entities in said format usable by said navigation application program functions to said one of said navigation application program functions.

26. The method of claim 25 further comprising the step of:
if said plurality of data entities exceeds a first threshold, providing a first partial result set of said plurality of data entities up to said first threshold in said format usable by said navigation application program functions to said one of said navigation application program functions and maintaining entity identifiers for a portion of said plurality data entities exceeding said first threshold.

27. The method of claim 25 further comprising the steps of:
if said plurality of data entities exceeds a first threshold and a second threshold greater than said first threshold, providing a first partial result set of said plurality of data entities up to said first threshold in said format usable by said navigation application program functions to said one of said navigation application program functions,
maintaining entity identifiers for a portion of said plurality data entities exceeding said first threshold, and
maintaining a reference cursor to reexecute said request for geographic data for data entities exceeding said second threshold.

28. A method of using a computer-based navigation system wherein said navigation system includes navigation application program functions wherein said navigation application program functions are adapted to use a geographic database stored on a computer-readable storage medium in a physical storage format, the method comprising:

reading a metadata file from said storage medium;
storing a portion of said metadata file in memory;
accepting a request from one of said navigation application program functions for geographic data;
transforming geographic data stored in said physical storage format into a format usable by said navigation application including using said metadata file to translate from a version level of said physical storage format to a version level of said navigation application program functions; and
providing said transformed geographic data to said one of said navigation application program functions.

29. The method of claim 28 wherein said metadata file comprises tables for different version levels, and wherein the method further comprises the step of:
using a version level of a data access interface layer that performs the step of accepting a request from one of the navigation applications for geographic data to identify which of said tables to use.

30. The invention of claim 28 wherein said metadata file includes information that describes content of various data attributes and values appearing in a given database entity at a given version level.

31. The method of claim 28 wherein said step of transforming further comprises:
converting from said physical storage format into a decompressed intermediate format; and
converting from said decompressed intermediate format into the format useable by the navigation application.

32. The method of claim 28 wherein said step of transforming further comprises:
using said metadata file to extract a data element relative to a beginning of a particular physical storage format entity.

33. The method of claim 28 wherein the step of reading a metadata file from said storage medium is performed through an operating system kernel.

34. The method of claim 28 wherein the step of reading a metadata file from said storage medium is performed through a physical devices subsystem that includes an operation system isolation layer and a media device isolation layer.

35. The method of claim 28 wherein the step of reading a metadata file from said storage medium is performed at initialization.

36. The method of claim 28 further comprising the step of:

maintaining the metadata file in memory during operation of the navigation system so that said metadata file can be used during subsequent data accesses from said storage medium.

37. A computer program product for use in a navigation system wherein the navigation system includes a navigation application program that provides navigating features to a user of the navigation system and a geographic database stored on a physical storage medium in a computer-readable physical storage format, said computer program product comprising an interface layer comprising:

programming that accepts and processes requests for geographic data from the navigation application program; and programming that translates geographic data from said physical storage format and provides said geographic data to said navigation application program, wherein said programming that translates is responsive to metadata provided with said geographic data and which is used to translate said geographic data at a first version level to a second version level and provide said geographic data at said second version level to said navigation application program.

38. The invention of claim 37 wherein said metadata comprises tables for different version levels.

39. The invention of claim 38 wherein said tables are provided for each data version level from an earliest version level to a current version level.

40. The invention of claim 37 wherein said storage medium comprises one of a CD-ROM disk and PCMCIA card.

41. The invention of claim 37 wherein said metadata is used to provide backward compatibility.

42. The invention of claim 37 wherein said metadata allows a newer navigation application software program to use an older version of a geographic database.

43. A method by which navigation systems implemented on different hardware platforms can use copies of a geographic database having a same format, the method comprising the steps of:

providing copies of interface layer programming to manufacturers of said navigation systems implemented on different hardware platforms, wherein said interface layer programming provides a common interface from which a navigation application in each of said navigation systems implemented on different hardware platforms can request geographic data contained in a geographic database associated therewith, wherein the geographic database associated with each of said navigation systems is in said same format; and installing said copies of said interface layer programming in each of said navigation systems implemented on said different hardware platforms.

44. The invention of claim 34 further comprising the steps of:

when operating each of said navigation systems implemented on different hardware platforms, using said navigation application to request geographic data from said interface layer programming according to said common interface; and using said interface layer programming to access and read data from the geographic database in the same format associated therewith to satisfy requests for geographic data from said navigation application.

45. The invention of claim 34 wherein said interface layer programming further comprises:

query logic programming that receives requests from the navigation application for geographic data;

data transformation programming that transforms geographic data from a physical storage format of a physical storage medium upon which said geographic database is stored; and data return programming that provides said transformed geographic data to said navigation application in response to said requests.

46. The invention of claim 45 wherein said interface layer programming further comprises:

indexes management programming responsive to said query logic programming and comprising:

programming that associates said requests from said navigation application with parcel identifiers associated with parcels in said physical storage format containing geographic data; and programming that provides said parcel identifiers to memory management library programming to obtain said parcels to provide to said data transformation programming for transformation therein.

47. The invention of claim 46 wherein said indexes management programming further comprises:

programming that obtains said parcel identifiers from said geographic database, and programming that obtains pointers to parcels on said physical storage medium containing geographic data for responding to said requests by said navigation application.

48. The invention of claim 46 wherein said programming that manages indexes further comprises:

programming that translates specific entity identifiers passed from said navigation application to parcel identifiers for parcels on said physical storage medium.

49. The invention of claim 46 wherein said programming that manages indexes further comprises:

programming that takes index specifiers and query parameters from said query logic programming and returns a set of parcel identifiers.

50. A computer program product for use in a navigation system wherein the navigation system includes a navigation application program for providing navigating features to a user of the navigation system and a geographic database stored on a physical storage medium in a computer-readable physical storage format, said computer program product comprising an interface layer comprising:

programming that provides a C language data structure view to the navigation application program;

programming that accepts and processes requests for geographic data from the navigation application program; and programming that translates geographic data from said physical storage format and provides said geographic data to said navigation application program as a C language data structure in a fully decompressed form.

* * * * *